US012298763B2

(12) United States Patent
Cacioppo et al.

(10) Patent No.: US 12,298,763 B2
(45) Date of Patent: *May 13, 2025

(54) METHODS AND APPARATUS FOR CONTROLLING AUTONOMOUS VEHICLES

(71) Applicant: Ocado Innovation Limited, Hatfield (GB)

(72) Inventors: Christopher Cacioppo, Somerville, MA (US); Corey Simons, Merrimac, MA (US)

(73) Assignee: Ocado Innovation Limited, Hatfield (GB)

( * ) Notice: Subject to any disclaimer, the term of this patent is extended or adjusted under 35 U.S.C. 154(b) by 127 days.

This patent is subject to a terminal disclaimer.

(21) Appl. No.: 18/124,990

(22) Filed: Mar. 22, 2023

(65) Prior Publication Data
US 2023/0229161 A1    Jul. 20, 2023

Related U.S. Application Data

(63) Continuation of application No. 16/952,003, filed on Nov. 18, 2020, now Pat. No. 11,635,757.

(51) Int. Cl.
*G05D 1/00* (2024.01)
(52) U.S. Cl.
CPC ......... *G05D 1/0061* (2013.01); *G05D 1/0217* (2013.01)
(58) Field of Classification Search
CPC .......... G05D 1/0061; G05D 1/0217; G05D 2201/0216; G05D 1/0027; G05D 1/0287; G05D 1/221; G05D 1/686; G05D 1/656; G05D 1/667; G05B 19/41895;
(Continued)

(56) References Cited

U.S. PATENT DOCUMENTS

| 11,635,757 | B2* | 4/2023 | Cacioppo | G05D 1/0217 |
| | | | | 701/23 |
| 2020/0223635 | A1 | 7/2020 | Govindaswamy | |
| 2020/0246972 | A1* | 8/2020 | Johnson | B25J 9/1666 |

OTHER PUBLICATIONS

Non-Final Office Action on U.S. Appl. No. 16/952,003 DTD Aug. 12, 2022.

(Continued)

*Primary Examiner* — Bao Long T Nguyen
(74) *Attorney, Agent, or Firm* — Foley & Lardner LLP

(57) ABSTRACT

Methods and apparatus for making autonomous vehicle handover decisions are described. A handover decision involves deciding if an autonomous vehicle should be handed off from one worker to another worker. The methods allow for decisions to be made in real or near real time shortly before an autonomous vehicle changes location. Worker time, if a handover is not implemented, is considered including the amount of worker time involved with the worker moving with the autonomous vehicle to the new location as compared to a new worker meeting the autonomous vehicle at the new location or on the way to the new location. Handover decisions can consider worker distribution and/or order priority. Such factors can be used to weight one or more time based cost values with a cost value representation of the cost if a handover is not implemented vs implementing a handover being compared to make the handover decision.

22 Claims, 11 Drawing Sheets

(58) Field of Classification Search
CPC ..... G06Q 10/08; G06Q 50/28; B60W 60/005; B60W 60/0011
See application file for complete search history.

(56) References Cited

OTHER PUBLICATIONS

Notice of Allowance on U.S. Appl. No. 16/952,003 DTD Dec. 22, 2022.

* cited by examiner

|  | | 300 |  |
|---|---|---|---|
| | PICK LIST 1 302 | | |
| 304 ↓ SHELF/RACK LOCATION 306 ↓ | | 308 ↓ | 310 ↓ |
| WAREHOUSE AREA | SHELF/RACK LOCATION | ITEM | QUANTITY |
| AREA A | S1 | H | 1 |
| AREA B | S3 | I | 3 |
| AREA C | S2 | J | 2 |
| AREA D | S4 | K | 1 |

312 → (row AREA A)
314 → (row AREA B)
316 → (row AREA C)
318 → (row AREA D)

FIGURE 3

| FIGURE 5A |
| FIGURE 5B |
| FIGURE 5C |

FIGURE 5

METHODS AND APPARATUS FOR CONTROLLING AUTONOMOUS VEHICLES

CROSS-REFERENCE TO RELATED APPLICATIONS

This application is a continuation of U.S. patent application Ser. No. 16/952,003, filed Nov. 18, 2020, which is incorporated herein by reference in its entirety for all purposes.

FIELD

The present application relates to methods and apparatus for controlling autonomous vehicles, e.g., robotic devices such as robotic carts, and, more particularly, to controlling autonomous vehicles to associate them with operators, and yet more particularly, to methods and apparatus for assigning devices to workers to complete location dependent operations, e.g., picks of items from storage locations or the placement of items into storage locations.

BACKGROUND

Efficient use of resources is important to many systems including warehouse systems. In the context of warehouse systems resources to be used may include robotic equipment such as a robotic cart used to transport goods. Some example applications where such robotic carts are used include picking of items from storage locations to complete one or more orders and/or the placement of items into storage locations as part of a stocking or restocking process.

Human workers, e.g., associates, may be employed to pick items that are then loaded onto such robotic carts. Time spent by the robotic carts and these human operators often involves travel time from one location within a warehouse to another location within that warehouse. Attempts have been made to efficiently use time in such scenarios. Such attempts often involve the use of zones in a warehouse system with workers being assigned to pick or stock items from an individual zone or zones.

In order to meet service level agreements and maintain profitability, there is a constant pressure to keep a fulfillment operation, e.g., a warehouse operation in which orders are satisfied, running efficiently. Enabling associates to spend more time picking products and less time walking from one place to another is a goal of many warehouse systems. To reduce the amount of time spent by a worker walking around, collaborative robots, e.g., robotic carts, are sometimes used with a worker meeting a robotic cart to perform one or more pick operations. Robotic carts are useful at eliminating or reducing worker walks to induct cartons and/or drop off fulfillments to the correct locations. However robotic carts normally do not remove walking between pick locations.

One technique which has been used to reduce the amount of walking that is required is to break the picking area into zones and assign particular robotic carts and associates to stay within them. This can be especially effective if there are sparse picks over a large area but less than ideal in many other situations.

In view of the above, it should be appreciated that there is a need for methods and/or apparatus which allow for the efficient use of warehouse resources including equipment and/or worker time.

SUMMARY

In various embodiments the need for zones within a warehouse or other system is avoided. While the methods and apparatus do not require the use of zones, in various embodiments the methods and/or apparatus are used in combination with zones, e.g., with crossing a zone boundary to complete an operation being considered as one of several factors used in making a resource allocation.

In the case of fixed zones, there are two interrelated problems that may cause zones to be less effective than operators hope. The interrelated problems include: i) defining zone areas and ii) labor balancing.

With regard to zone area definition, in many systems zone areas are set with the intent to evenly distribute work and ideally put common clusters of work in one area. The problem is that it is extraordinarily difficult to predict commonly clustered Stock Keeping Units (SKUs). Order profiles are constantly changing over time—from season to season and even over the course of the day. Warehouses are sometimes broken into zones based on physical size and then never adjusted again leading to zones that don't efficiently match actual pick operations that may vary seasonally or based on product demand.

With regard to the second related problem of labor balancing, over the course of a shift, an operator normally wants their associates to spend as much time as possible actively picking rather than traveling from one pick to the next or, even worse, being idle. When utilizing a zone picking method, an attempt is often made to have orders evenly distributed across the existing zones so that each associate is engaged. Unfortunately, this rarely happens. In many existing zone based warehouse systems there are often drastically different work loads across zones.

While labor, e.g. worker, resources are an important resource to manage, efficient utilization of autonomous vehicles can also be important to efficient use of resources. Having a large number of unused or idle autonomous vehicles can result in inefficient capital allocation and, more importantly, the need to maintain more equipment, e.g. autonomous vehicles, than is necessary.

Although some warehouses use zones, it would be desirable if methods and apparatus could be developed which would allow for efficient allocation of resources, e.g., workers and/or autonomous vehicles, for use in item pick and/or stocking operations, without the need for zones. While it would be desirable that zones not be required, it would also be desirable that if one or more of the methods or apparatus could be used in a system which used zones.

In accordance with various aspects an autonomous vehicle is associated with a series of location dependent operations, e.g., a pick list to be implemented. The autonomous vehicle may be, and sometimes is, a robotic cart which can move autonomously between locations in a warehouse or move with a worker between locations in the warehouse. The location dependent operations may be, e.g., item picks for one or more orders which have been grouped together for processing and/or one or more restocking operations. Thus, an autonomous vehicle is associated, as part of the resource allocation process, with a series of locations, where each of the locations correspond to one or more item pick or placement operations that are to be performed, e.g., sequentially.

While explained in the context of a robotic cart used for pick or stocking operations, the methods and apparatus of the invention relating to worker assignment to autonomous vehicles are applicable to a wide range of applications where an autonomous vehicle is assigned a series of location specific tasks which involve a human worker. For example, in manufacturing operations an autonomous vehicle may transport an item being assembled between a plurality of workstations with a worker being responsible for one or more tasks at each workstation. The methods and apparatus of the invention can be, and sometimes are, used in such embodiments to determine when a worker should stay with the autonomous vehicle and assist in the operations at various workstations and/or when the autonomous vehicle should be handed off to another worker. In the case of the handoff, the new worker replaces the initial worker associated with the autonomous vehicle and performs one or more additional location dependent tasks, e.g., item assembly operations.

As part of the resource allocation processes implemented by a control system, a decision is made, once a task is completed, e.g., whether it be the initial task or a subsequent task that is completed, as to whether the worker assigned to perform the task should be assigned to another robotic cart, and thus another location dependent task list, or should remain and travel with the autonomous vehicle to the next location on the device's assigned task list. This decision, in various embodiments, is an automated decision involving a cost function that is evaluated and used for decision making by the processor of the control system and/or a processor in the mobile cart which acts as part of the control system when making handover decisions. Depending on the embodiment the decision may be made at different times. In some embodiments the decision could is determined when the work is generated or at the time the task completion or anywhere in between. Preassigning, e.g., before a worker begins work with a cart, when a handoff is to be implemented, is easier in some implementations than making such determinations during a sequence of tasks since it does not require connectivity to one or more systems providing work or other information during the period of time that tasks are being performed or the cart is moving from location to location. Making the cart handoff decisions at a later time during the work processes provides more time and information that can be used to more accurately estimates costs since changes relating to traffic and/or worker availability might occur if the decision is made earlier and such information might not be available if the decision is made at an earlier time.

During operation, as part of making a handover decision, the control system takes into consideration various times associated with satisfying a task list. Times which can be, and sometimes are, considered by the control system include the time a worker will spend traveling to meet up with an autonomous vehicle, the time a worker spends logging into the autonomous vehicle so he/she can use the device, and/or the time spent by a worker traveling between locations with a cart. Such times are all examples of worker time which can be considered wasted in that the worker is not performing the productive tasks to be completed using the autonomous vehicle, e.g., performing pick operations or placement operations. In a pick operation, a worker picks an item from a storage location and then places it on the robot device e.g., robotic cart. In a placement operation, a worker removes the item from the robotic cart and places it in a storage location, e.g., as part of a stocking or restocking operation. In various embodiments, time spent by a worker performing activities other than picking or placing items are considered costs which ideally should be minimized. Such an approach considers worker time an important resource that should be utilized efficiently when possible.

In various embodiments, the control system generates, e.g. determines based on estimation, a first cost (C1) value, associated with the associate assigned to a cart continuing to the location of the next task on the task list and performing the next task. A second cost value (C2), which is a cost that would be incurred, from a resource utilization perspective, if a second worker were to meet the autonomous vehicle and take over and perform the next operation and the first worker were to move on to work with another robotic cart, is also determined, e.g., estimated. The first and second costs ((C1) and (C2)) are then compared, and a decision is made whether the autonomous vehicle, e.g., cart handoff should be made. Handoff costs may be, and sometimes are, weighted to take into consideration whether a cart is processing a high priority order. In some such embodiments the cost of completing a handoff for a high priority order is increased compared to the cost of not completing a handoff since the handoff may result in or add to delays in completing an order. This discourages handovers, also sometimes referred to as handoffs, and the possible associated time delays, in the case of high priority orders.

If the decision is to implement a cart handoff, the worker associated with the cart, e.g., the first worker associated with the first cart, is assigned to another cart and the second worker is assigned to the first cart. The cart can, and sometimes does, automatically travel from the first pick location to the second pick location and, depending on the embodiment, may meet the second worker on the way to the second location.

By taking into consideration a wide range of factors, in the terms of weights which may, and sometimes do, contribute to the value generated by a cost function, used in the handover decision making process, efficient utilization of workers and/or robotic resources can be, and sometimes is, achieved, while also allowing for effective management of the distribution of workers throughout a warehouse.

While various features, factors and weights are used in some embodiments, not all the features discussed above need be used or included in each embodiment. Numerous variations on the above described methods and apparatus will be apparent in view of the detailed description which follows.

BRIEF DESCRIPTION OF THE FIGURES

FIG. 3 shows an example pick list that can be used in the system shown in FIG. 1.

FIG. 5 shows how FIGS. 5A, 5B and 5C can be combined to form the full example order processing and autonomous vehicle control routine used in some embodiment.

DETAILED DESCRIPTION

Figure 1:
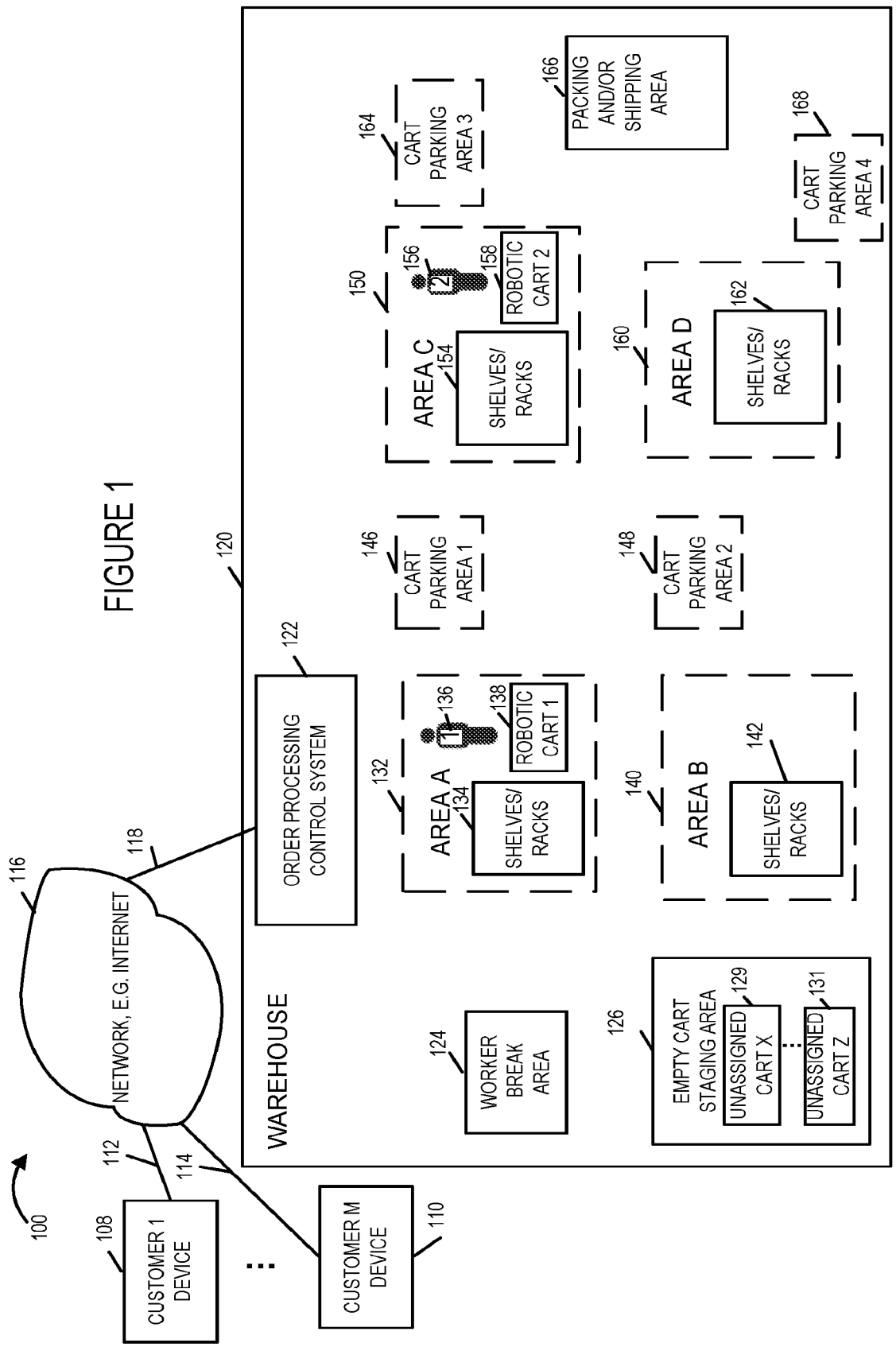
FIG. 1 illustrates an example system implemented in accordance with the invention.

FIG. 1 illustrates an example system 100 implemented in accordance with the invention. In the system autonomous vehicles, e.g., robotic pick carts, are used. The autonomous vehicles may be and sometimes are fully autonomous and in other embodiments partially autonomous. Reference is made to robotic carts in the figures and/or various places in the specification. Such robotic carts are exemplary and it should be appreciated that the methods and apparatus of the invention can be used with a wide range of autonomous vehicles and are not limited to the exemplary robotic carts used in some embodiments.

The system 100 includes a number of customer devices 108, 110 through which orders for items can be placed. The customer devices 108, 110 are coupled via communications links 112, 114, respectively, by communications network 116, e.g., the Internet, and by communications link 118, to an order processing and/or control system 122 which may be, and in some embodiments is, located at a warehouse 120. The system 122 will simply be referred to as a control system for purposes of explaining the invention, since it controls one or more devices, said controlling including determining, generating and sending autonomous vehicle assignments and/or workers to robotic cart assignments. The order processing and/or control system 122 may be implemented as a distributed system or as a single device. In the case of a distributed system one or more processors located outside the warehouse or in other devices may be, and sometimes are, used to perform one or more steps attributed to the order processing and control system 122 in the example described embodiment. In addition to the control system 122, the warehouse 120 includes a worker break area 124, an empty cart staging area 126, a first item storage area, Area A 132, a second item storage area, Area B 140, a third item storage area, Area C 150, a fourth item storage area, Area D 160, first through fourth cart parking areas 146, 148, 164, 168 and a packing and/or shipping area 166.

The empty cart staging area 126 is an area to which empty carts 129, 131 are transported and stored until assignment to a pick list and work. Worker break area 124 is an area where workers can take rest breaks, e.g., between periods of time during which they are associated with autonomous vehicles, e.g., robotic carts, to perform operations, e.g., item pick operations.

Storage area A 132 includes shelves and/or racks 134, where items are stored. In the example, worker 1 136 associated with a first robotic cart 138 is shown in front of the shelves/racks 134 so that the worker 136 can pick items from the shelves. Storage area B 140 includes shelves/racks 142. Storage Area C 150 includes shelves/racks 154 and a second robotic cart 158 and second worker 156, associated with the second robotic cart 158 and performing pick operations in area C 150. Area D 160 includes shelves/racks 162. Outside and near each item storage area (area A 132, area B 140, area C 150, area D 160) is a cart parking area (146, 148, 164 and 168), respectively. The cart parking areas (146, 148, 164, 168) are locations to which carts can automatically travel and park between pick operations, e.g., with the cart parking areas serving as an intermediate meeting point where a worker can meet up and log in to a cart to which he/she is assigned.

The cart parking areas may be useful when there may be a delay with a worker joining up to begin working with a cart or if the worker will pass near a parking area on the way to a pick operation. Parking a cart as part of a handover process can allow for efficient use of worker time since a worker can complete a pick operation and then meet a waiting cart to proceed with a new pick operation, e.g., as part of a handover operation. While a cart may be idle for a brief period of time at a cart parking area, picker time is utilized efficiently by having a cart ready and waiting for the picker. By placing the cart parking area near but outside the pick areas, cart storage is possible without interfering with pick and/or stocking operations. While in some cases a robotic cart may automatically go to a cart parking area to meet up with a worker during a handover, in some cases the meet location is a storage area where the next pick is to occur. Such a case can be particularly efficient when there is a worker available in the pick area where the next pick is to occur.

Because the carts 129, 131, 138 and 158 are robotic, they can, and sometimes do, travel between locations without a human worker present. For example, as part of a handover a robotic cart may, and sometimes does, travel to a meeting location unaccompanied by a worker. Similarly once a pick is complete the loaded cart can leave the worker, who completed the loading, and travel on its own to the packing and/or shipping area 166 to be unloaded and for the order to be shipped. Once unloaded the empty cart automatically returns to the empty cart staging area 126 until assigned for use with another pick list and worker.

Human workers 136, 156 sometimes wear earpieces and receive audio instructions from the control system 122 and/or carts with which they are associated. Thus, it should be appreciated that the control system 122 can, and sometimes does, instruct a worker as to which robotic cart the worker is to use and where he/she is to meet up with the cart.

While the system 100 includes multiple areas, it does not depend on zones with respect to the assignment of workers to mobile carts and/or pick operations. Rather decisions are dynamically made based on worker location and time/cost analysis to determine when autonomous vehicle (e.g., robotic cart) handovers are to be implemented.

Such decisions are made by the control system 122. The control system 122 generates from orders, one or more pick lists which are then assigned to an autonomous vehicle, e.g., mobile robotic cart, for picking operations. A worker 136 or 156 is assigned, e.g., associated with the robotic cart. Handover decisions are made for each change in task location, e.g., pick location. The handover decisions can be, and sometimes are, made before assignment of a pick list to a cart and/or worker. However, in at least some embodiments, as tasks are completed and shortly before the robotic cart is going to move from one location to another, a handover decision is made. In such an embodiment, handover decisions can be made with real time or near real time information about worker availability and/or location. This can result in efficient handover decisions which provide good use of worker time without the need for the use of fixed zones.

Figure 2:
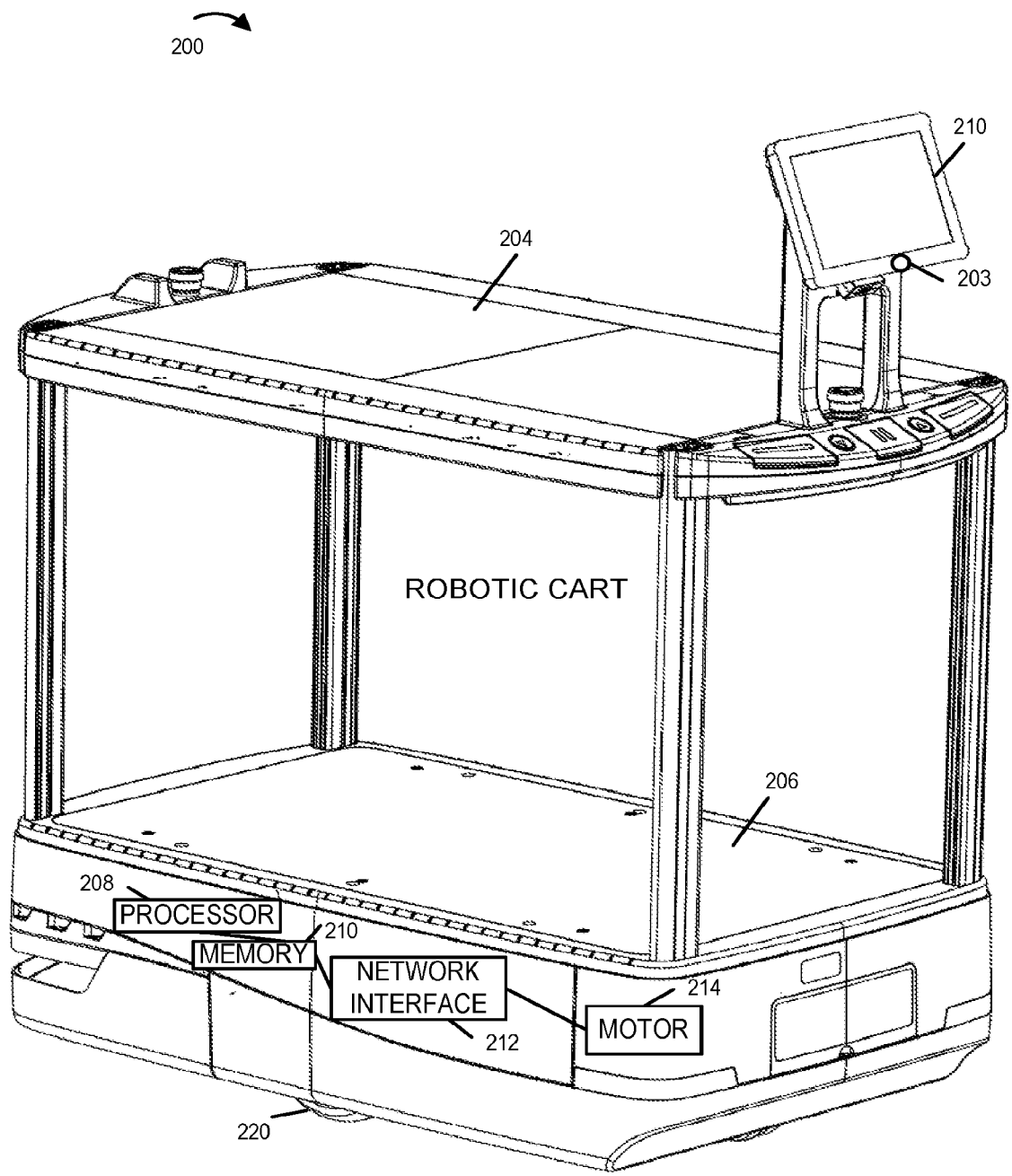
FIG. 2 shows an example autonomous vehicle, e.g., robotic pick cart, that can be used as any of the robotic pick carts shown in the other figures.

FIG. 2 shows an example autonomous vehicle, e.g., an example two shelf robotic pick cart 200, which can be used as any one of the robotic carts shown in the other figures. One or more receptacles can be, and sometimes are, transported on each of the shelves 204, 206 of the robotic cart 200. The robotic cart includes a processor 208, memory 210, network interface 212, motor 214 and wheels 220, which are driven by the motor 214. In addition to these components and shelves 204, 206, the cart 200 includes a user interface including display 210 and speaker 203. The network interface 212 is a wireless network interface capable of receiving commands and information from the order processing and control system 122 and sending information, e.g., cart location and order pick status information, to the order processing and control system 122 via wireless signals. The memory 210 is used to store pick list and path information received from the order processing and control system 122. The pick list information may be, and sometimes does, include the information shown in the example pick list 300 shown in FIG. 3. In addition to the information shown in FIG. 3, in some, but not necessarily all, embodiments the pick list information also includes information on the number of receptacles to be carried on the cart 200, their locations on the cart 200 and which items are to be placed in the individual receptacles. The memory 210 also stores information used to prompt and guide a human operator e.g., worker associated with the cart 200, to pick items as the robotic cart 200 automatically travels through the warehouse under the control of processor 208 and/or one or more processors in the order processing and control system 122. The processor in the control system 122 or the processor 208 of the robotic cart 200 can make handover decisions and control robotic cart operation in accordance with the handover decisions as will be discussed below. The cart 200, through visual signals displayed on display 210 and/or audio instructions provided via speaker 203 instructs a human worker, e.g., picker, to pick particular items for an order and to place them in a receptacle on the cart 200 which was allocated for the storage of the picked item. The processor 208 in the cart and/or system 122 also controls the robotic cart 200 to move to/from one pick location to the next and/or to a meeting location when a handover is to be made to a new worker. In the case of a handover the meeting location can be a cart parking area, e.g., 146, 148, 164 or 168 or a next pick location depending on which location is more efficient to use as a meet location. For example if a second worker will pass a cart parking area on his/her way to the next pick location, the cart parking area may be, and sometimes is, selected as the meet location since it is out of the way and parking the cart there while the second worker meets up with the cart will not interfere with other pick operations.

However, if there is no cart parking area on the second workers path to the second pick location, it may be more efficient for the cart to automatically travel to the next pick location and meet the second worker at the pick location. The cart may, and sometimes does, autonomously travel without a worker between a first pick location and a second pick or meeting location when a mobile cart handover is to be implemented. In cases where a handover is not to be implemented, the mobile cart 200 guides the worker, e.g., a first worker, assigned to work with the mobile cart 200, and thus associated with the cart by the assignment, to the next pick location. When a handover is implemented the mobile cart 200 may, and often does, require the second worker to log in to the mobile cart 200 via the touch screen 210 prior to the robotic cart providing guidance as to the next pick operation to be performed.

While a two shelf cart embodiment is shown, multiple robotic cart configurations are possible, with some carts being implemented using a single shelf while other carts have two or more shelves for carrying receptacles.

FIG. 3 shows an example pick list 300 that can be used in the system shown in FIG. 1. The pick list 300 is generated by the control system 122 from one or more orders by the control system 122 in some embodiments. The pick list 300 is a task list in that each row 312, 314, 316, 318 with an item listed corresponds to a pick task. Each row of the pick list 300 includes location information in the first two columns 304, 306, item identification information in the third column 308 and quantity information in the fourth column 310. In cases where items are to be placed in a particular bin on a robotic cart to which the pick list is assigned, a fifth column with bin identification information is added to provide the worker with information as to which bin on the cart the picked item should be placed. This additional bin column is useful in embodiments where different bins on the robotic cart correspond to different orders.

The first column 304 of location information indicates the warehouse area to which a pick operation corresponds, while the second column 306 indicates the particular location, e.g., shelf or rack location, where the item to be picked is located.

Consider, for example, row 312 which indicates that one of item H is to be picked from the shelf location S1 of Area A. Row 314 indicates that, as part of a second pick operation, 3 of Item I should be picked from shelf location S3 in Area B. In order to complete the pick list, the mobile robotic cart, to which pick list 300 is assigned, will have to travel from Area A to Area B. If a handover is to be implemented, the worker who was associated with the robotic cart for the Area A pick will not accompany the robotic cart as it moves from Area A to Area B, where another worker will perform the Area B pick. However if a decision is made that a handover should not be made as part of the process of the mobile cart moving to Area B, the worker associated with the robotic cart will travel with the cart from Area A to Area B. The process of making handover decisions will be explained in detail below.

Figure 4:
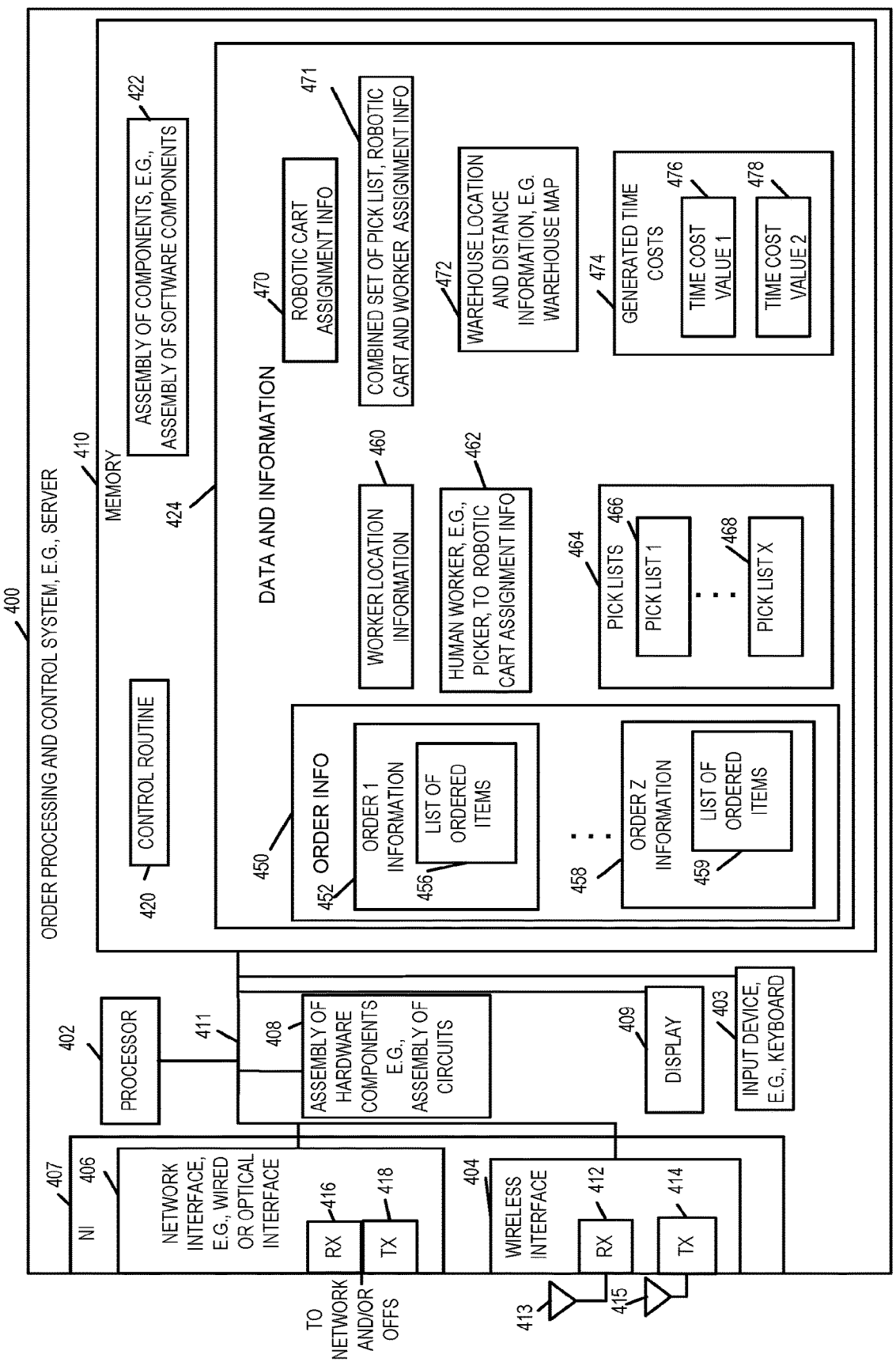
FIG. 4 shows an example order processing and control system that can be used as the order processing and control system shown in FIG. 1.

FIG. 4 shows an example order processing and control system 400 that can be used as the order processing and control system 122 shown in FIG. 1. The control system 400 includes a network interface (NI) 407, processor 402, assembly of hardware components 408, display 409, input device 403 and memory 410 which may be, and sometimes are, coupled together as shown in FIG. 4 by bus 411.

The network interface 407 includes a wired or optical interface 406 with receiver 416 and transmitter circuitry 418. The network interface 407 also includes a wireless interface 404 including a receiver circuit 412 coupled to a receive antenna 413 and a transmitter circuit 414 coupled to a transmit antenna 415. Via the wired interface 406 and/or the wireless interface 404 the control system 400 can receive and send data including order data. The control system 400 can also wirelessly communicate instructions, data and task lists, e.g., pick list 300, to one or more mobile autonomous vehicles, 138, 158 and/or wireless communications devices used by human workers 136, 156 such as tablet devices, cell phones and/or wireless headsets. Thus, the control system 400 can receive order information, generate task lists, mobile robotic cart assignments, worker assignments and communicate such information to the workers and/or robotic carts. Location information, e.g., worker and/or robotic cart location information, can be, and sometimes is, communicated to the control system 400 in real time from worker devices and/or the robotic carts 138, 158. Task status information, such as task completion of a pick operation or pick list is communicated to the control system 400 form the robotic carts 138, 158 e.g., wirelessly. Handover decisions and/or worker assignments are communicated to the workers and/or robotic carts 138, 158 wirelessly.

Figure 5A:
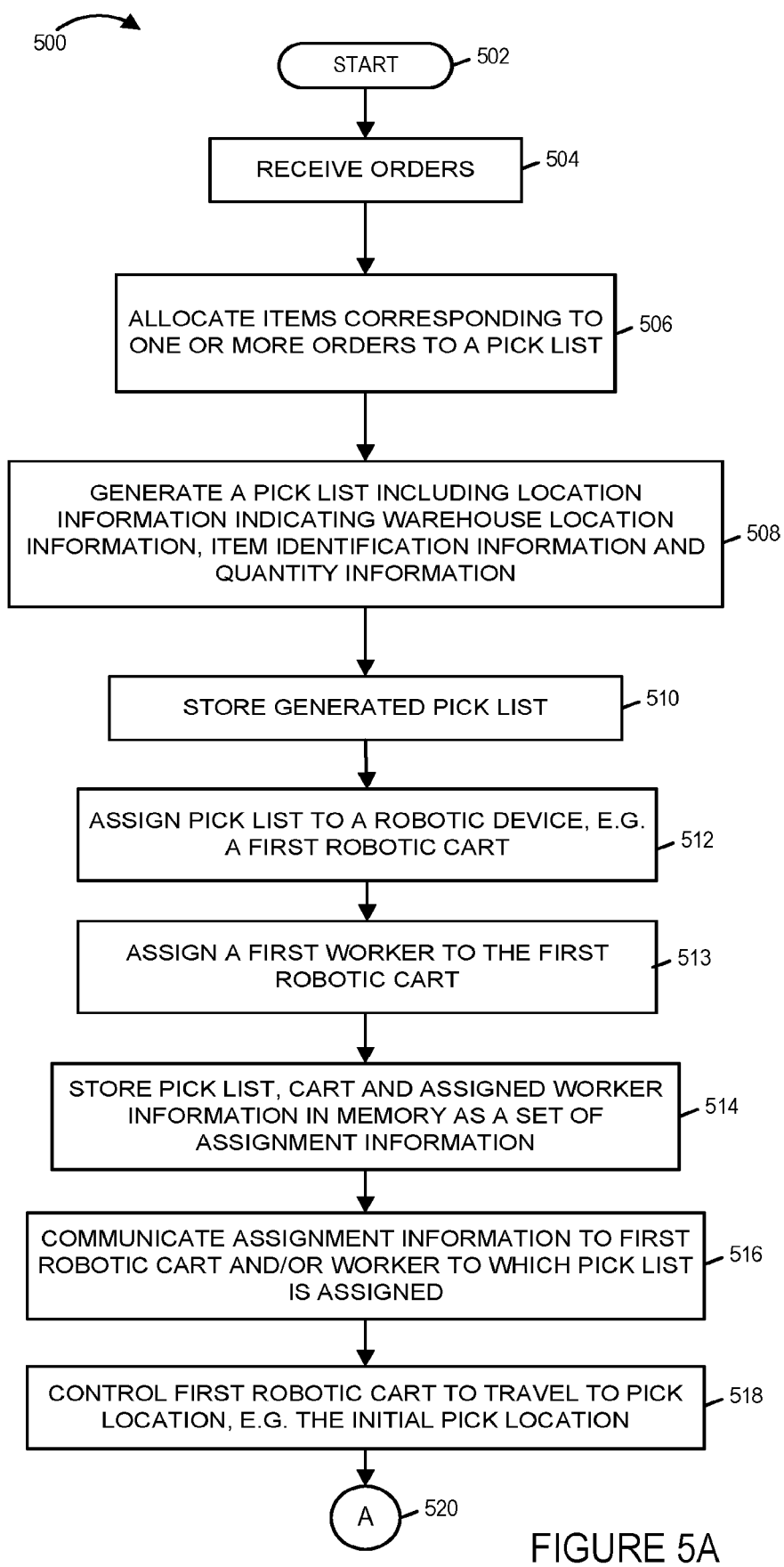
FIG. 5A shows the steps of a first part of an example order processing and robotic device control routine that is implemented in some embodiments.
Figure 5B:
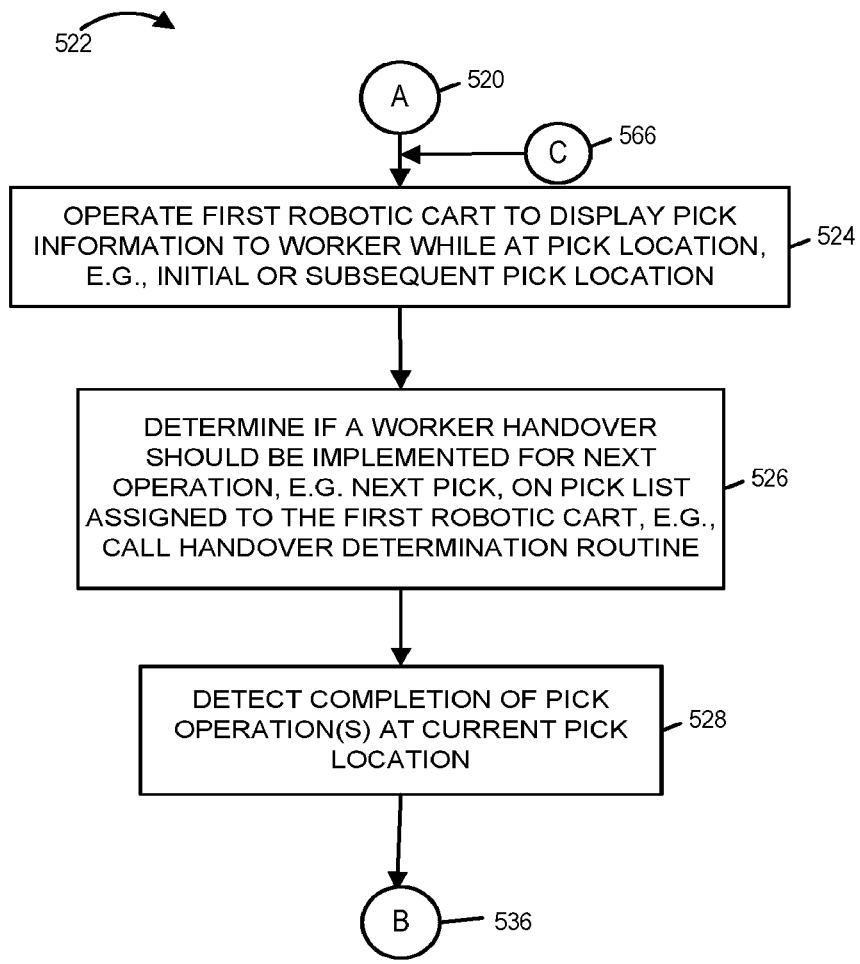
FIG. 5B shows the steps of a second part of the example order processing and autonomous vehicle control routine that is implemented in some embodiments.
Figure 5C:
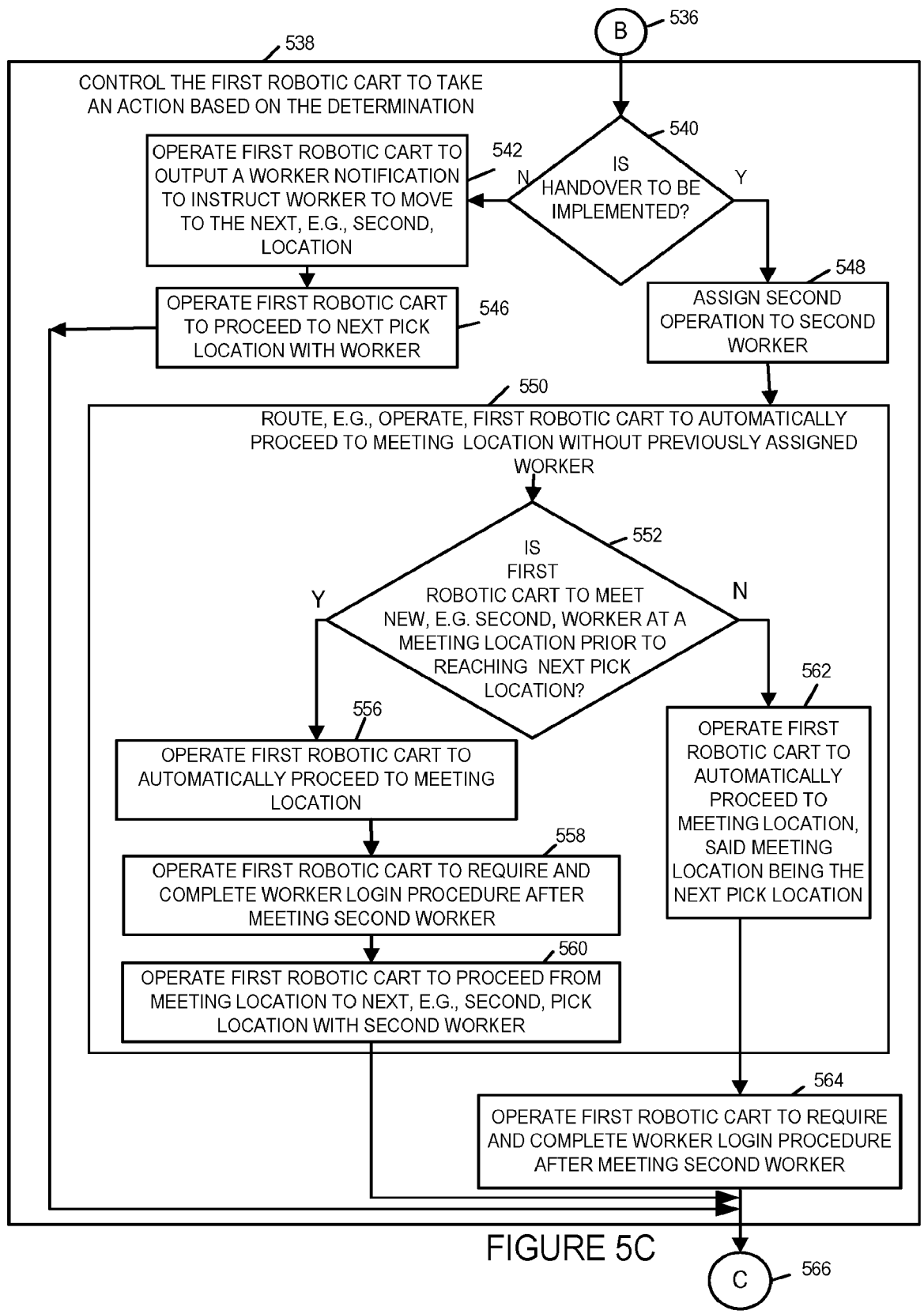
FIG. 5C shows the steps of a third part of the example order processing and autonomous vehicle control routine that is implemented in some embodiments.
Figure 6:
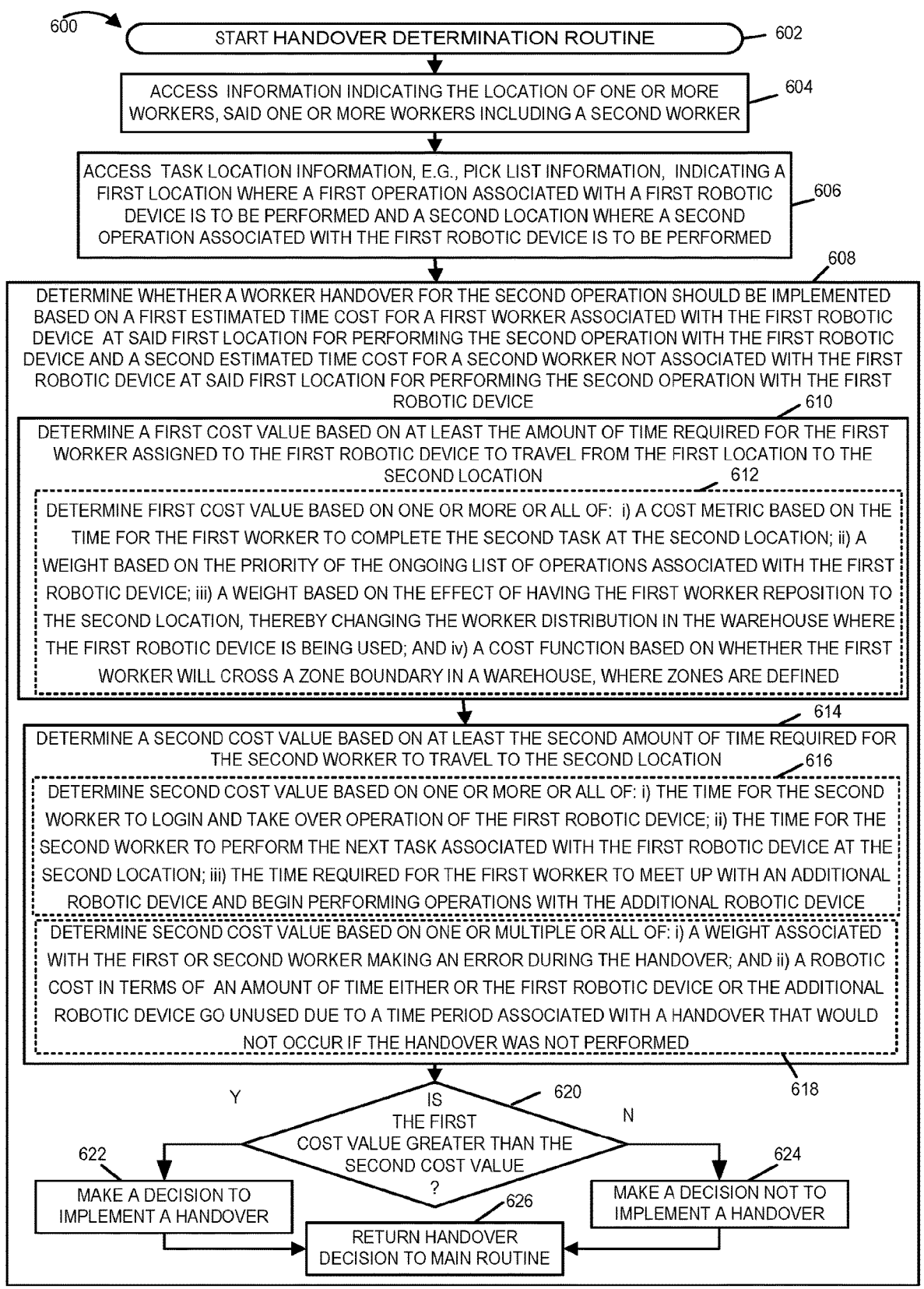
FIG. 6 shows the steps of an example handover determination routine that can be, and sometimes is, called by the example order processing and autonomous vehicle control routine shown in the other figures of this application.

The processor 402, e.g., a CPU, controls operation of the control system 400 in accordance with the invention, e.g., to implement the steps shown in FIGS. 4, 5 and 6 of the present application. The assembly of modules 408 includes hardware components, e.g., circuitry used in some embodiments, such as an application-specific integrated circuit (ASIC) which is a dedicated processor which in a hardware embodiment controls the control system 400 to implement the method steps shown in the various other figures. Memory 410 includes control routine 420, which when executed by the processor 402 causes the server to operate in accordance with the invention and perform the steps of the methods shown in FIGS. 4, 5 and 6. The memory also includes an assembly of components, e.g., an assembly of software components 422, which include software or lines of code for controlling the control system 400 to implement one, more or all of the steps of the methods described herein.

The memory 410 also includes data/information 424 which includes order information 450, worker location information 460, human worker, e.g., picker, to robotic cart assignment information 462, pick lists 464, robotic cart assignment information 470, warehouse location and distance information, e.g., a warehouse map 472, and a set of generated time costs, e.g., values, 474. The order information 450 includes information 452 corresponding to a first order which includes a list of ordered items 456. The order information 452 may, and also sometimes does, include billing and/or contact information for a customer to which the first order 452 corresponds. The order information 450 includes similar order information for one or more additional orders including order Z information 458. The order Z information 458 includes a list of ordered items 459 in addition to customer and/or billing info corresponding to order Z. The control system 400 generates picks lists 464 from the order information. Pick lists 464 includes a first pick list 466 and additional pick lists including pick list X 468. The pick list 300 shown in FIG. 3 may be, and sometimes is, stored in the set of pick lists 464 and is an example of the content included in a pick list.

Worker location information 460 includes a list of workers and their current location. Human picker to robotic cart assignment information 462 includes worker availability information, e.g., whether they are occupied with one or more assignments corresponding to a robotic cart and corresponding pick(s) or are available at the present time or likely to be available in the near future to perform a pick. From robotic cart assignment information 470 the controller 400 knows which cart a worker is currently assigned to. Robotic cart assignment information 470 indicates a task list, e.g., pick list assigned to a cart. Based on the pick list assigned to the cart and the worker assigned to a cart a pick list, worker and robotic cart are associated with each other for one or more location dependent operations.

The data and information 424 also includes, in some but not necessarily all embodiments, warehouse location and distance information 472, e.g., map information, which can be used to estimate travel time between locations and the distance between a task or current location and a meeting location. This information 472 may be, and in some embodiments is, used in generating the time cost estimates 474. The time cost estimates 474 include first and second time cost values 476, 478 corresponding to a potential cart handoff.

The first time cost value 476 is based, in some embodiments, on a sum of one or more worker times which are likely to be incurred or used if a handover is not implemented when a cart switches from one task location to the next. The second time cost value 478 is based, in some embodiments, on one or more worker times which are likely to be incurred or used if a handover to a second worker is made, rather than allowing a first worker to stay with a robotic cart as it moves from one task location to the next. By comparing the cost values 476 and 478 a handover decision can be, and sometimes is, made as will be discussed below, e.g., with the decision (handover or no handover) corresponding to the lower cost value normally being selected.

During operation, the control system 122 can, and sometimes does, take into consideration the various times that can be associated with satisfying a task list such as the pick list 300 shown in FIG. 3. Times, which can be considered by the control system 122, include the time a worker 136 or 156 spends traveling to meet up with an autonomous vehicle, e.g., cart 138, the time a worker spends logging into the autonomous vehicle so he/she can use the device, and/or the time spent by a worker traveling between locations with a cart. Such times are all examples of worker time which can be considered wasted in that the worker is not performing the productive tasks to be completed using the autonomous vehicle, e.g., performing pick operations or placement operations. In a pick operation a worker picks an item from a storage location and then places it on the robot device e.g., robotic cart. In a placement operation a worker removes the item from the robotic cart and places it in a storage location, e.g., as part of a stocking or restocking operation. In various embodiments time spent by a worker performing activities other than picking or placing items are considered costs which ideally should be minimized. Such an approach considers worker time an important resource that should be utilized efficiently when possible.

While worker time can be thought of as a "cost", autonomous vehicles 138, 158 are another type of resource and thus "cost" to implement a system. Idle robotic time is often less important than a worker being idle from an efficiency perspective, but in some, but not necessarily all, embodiments it is considered as a factor that is taken into consideration when allocating resources. Allowing a robotic cart 138 or 158 to be idle for a short period of time while it is parked or heading to a site for a worker to meet up with it can be useful in that it potentially saves worker time in that a worker can complete one task and then join up with the mobile cart and perform the next task without a period of work idle time in between. Given the relative value of a worker's time, compared to the cost of a robotic cart being idle for a short period of time, incurring some cart idle time in a handoff may be and often is acceptable but should be accounted for if possible as part of a handoff cost.

Other factors that can affect system efficiency include an individual worker's particular suitability for particular pick operations, e.g., a tall worker may be better suited for particular location picks, e.g., picks from high locations due to the workers height, than a shorter worker. The cognitive condition of a particular worker may also be a factor in determining whether a worker should be assigned to a particular cart. For example, as a worker becomes tired he/she may become more likely to make login errors or get lost while navigating through a warehouse to meet up with a cart. Accordingly, the probability of a particular worker making an error when assigned to an autonomous vehicle to complete one or more operations can be, and in some, but not necessarily all, embodiments is, taken into consideration when making a resource allocation, e.g., when assigning a worker to a cart.

While the effective completion of location dependent tasks is an important factor in the control system 122 allocating resources, allocation of workers to particular task lists can have an effect on the distribution of workers in the warehouse 120. It can be desirable to take into consideration the distribution of workers in a warehouse when deciding whether a worker should continue to work with an autonomous vehicle and move with it or if another worker should be assigned to meet with the autonomous vehicle and continue to complete the list of tasks associated with the device. The switch or continued association of a user (worker) with a mobile device (robotic cart) 138 or 158 will have an effect on the distribution of workers in the warehouse 120. In some embodiments how the assignment of a worker 136, 156 to a robotic cart and where the worker will be located as he/she works with the robotic cart is taken into consideration with assignments to carts being controlled, in some but not all cases, to affect or manage the distribution of workers in the warehouse 120, e.g., to avoid congestion and ensure an adequate number of workers in each part of a warehouse 120 given the current or expected load conditions.

In various embodiments an automated process for assigning an autonomous vehicle 138 or 158 to be used for location dependent tasks and then assigning one or more workers 136, 156 to use the autonomous vehicle is described. By taking into consideration various factors corresponding to what may be considered costs and/or a particular goal of distributing workers throughout the warehouse 120 to avoid congestion and to have sufficient workers in an area for current or expected future needs, an effective allocation of autonomous vehicles and workers can be achieved by the control system 122 without the need for fixed zones.

In some embodiments where zones are used in combination with one or more methods, crossing a zone can be viewed as a "cost" which can be, and sometimes is, factored into whether a worker should remain with an autonomous vehicle or be assigned to a new autonomous vehicle. In this way while "zones" may exist and be defined, they are not rigid constructs in the system 100, and a worker 136, 156 is not limited to a particular zone and can in fact cross over into another zone if the resource allocation system considers it to be effective for a worker to do so.

In various embodiments a cart 138 or 158 is assigned to be used to complete a list, e.g., pick list 300, of location dependent tasks, e.g., picking items for one or more orders. A worker, sometimes referred to as an associate, is then assigned to the robotic cart 138 or 158 to perform the initial location dependent task, e.g., first pick or placement operation on the task list. The worker 136 or 156 assigned to the initial pick can be referred to a first worker for convenience. For purposes of explanation assume the worker 136 is assigned to the initial pick. In such a case by associating a worker 136 with an autonomous vehicle 138 and task list 300, the worker 136 is assigned one or more tasks on the list, with the worker 138 being responsible for performing the tasks on the list associated with the autonomous vehicle 138 while he/she remains with the autonomous vehicle 138.

As part of the resource allocation processes implemented by the control system 122, a decision is made as to whether, once a task is completed, e.g., whether it be the initial task or a subsequent task, the worker 136 assigned to perform the task should be assigned to another robotic cart, and thus another location dependent task list, or should remain and travel with the autonomous vehicle 136 to the next location on the device's assigned task list 300. This decision in various embodiments is an automated decision involving a cost function that is evaluated and used for decision making by the processor of the control system 122 and/or a processor in the mobile cart 138 which acts as part of the control system 122 when making handover decisions.

In various embodiments the control system 122 generates, e.g., determines based on estimation, a first cost (C1) value, associated with the associate assigned to a cart continuing to the location of the next task on the task list and performing the next task. A second cost value (C2), which is a cost that would be incurred, from a resource utilization perspective, if a second worker 156 were to meet the autonomous vehicle 138 and take over and perform the next operation and the first worker 136 were to move on to work with another robotic cart 136, is determined, e.g., estimated. The first and second costs ((C1) and (C2)) are then compared, and a decision is made whether the autonomous vehicle 138, e.g., robotic cart, handoff should be made. Handoff costs may be, and sometimes are, weighted to take into consideration whether a cart is processing a high priority order. In some such embodiments, the cost of completing a handoff for a high priority order is increased compared to the cost of not completing a handoff since the handoff may result in or add to delays in completing an order. This discourages handovers, also sometimes referred to as handoffs, and the possible associated time delays, in the case of high priority orders.

If the decision is to implement a cart handoff, the worker 136 associated with the cart 138, e.g., the first worker associated with the first cart, is assigned to another cart, e.g., cart 129, and the second worker 156 is assigned to the first cart 138. The cart 138 can, and sometimes does, automatically travel from the first pick location to the second pick location and, depending on the embodiment, may meet the second worker on the way to the second location.

By taking into consideration a wide range of factors, in the terms of weights which may, and sometimes do, contribute to the value generated by a cost function, used by the control system 122 in determining a cost, used in the handover decision making process, efficient utilization of workers and/or robotic resources can be, and sometimes is, achieved, while also allowing for effective management of the distribution of workers throughout a warehouse.

While the decision whether or not to implemented a handoff can be, and sometimes is, made at or near the time of completion of an individual task or set of tasks at a location, in at least some cases a complete set of tasks is determined promptly after assignment of a list of tasks and corresponding locations to a robotic cart, e.g., prior to a first worker meeting up with the robotic cart to implement the first of the assigned operations. In such embodiments the list of locations and decisions of when handoffs are to occur is loaded into an autonomous vehicle, e.g., robotic cart, while the cart is docked or in an area with known reliable communications. Thus, the risk of problems with wireless communications being interrupted or unreliable will not affect the mobile device's, e.g. mobile robotic cart's, ability to complete an assigned task list and provide information to the assigned associate(s) about a handoff. Updates of the task list and handoff decisions can be made on the fly in cases where cart is in wireless communications with the control system 122, e.g., with handoff decisions being made and updated as the worker signals completion of a task, e.g., item pick, by pressing a button or screen to send a task completion signal to the control system 122 responsible for task assignments.

In some, but not all embodiments, the decision of whether a worker should remain with an autonomous vehicle, e.g., robotic cart 138 or 158, and move to the next location or a device handover should be implemented can be, and sometimes is, implemented based on a comparison of two cost values where each cost value is determined based on one or more factors or weights. The weights can be additive or multiplicative and used to take into consideration various costs which may be, and often are, not directly associated with worker travel time.

In some embodiments the equation used by the control system 122 to decide whether a handoff is implemented is implemented as follows:

Implement handoff when C1>C2, where:

C1 is an estimate of a first cost of a first worker associated with a first autonomous vehicle remaining with the first autonomous vehicle and optionally, in some embodiments, the time of the first worker to perform a next operation assigned to the first autonomous vehicle which is to be performed at a second location which is different from a first location where the first worker is completing one or more tasks associated with the first autonomous vehicle; and C2 is an estimate of a second cost of a second worker being associated with the first autonomous vehicle and, reaching the second location where the first autonomous vehicle is to perform the next operation and the second cost further optionally including one more or all of:

i) an additional cost (e.g., travel plus login time) associated with the first worker becoming associated with an additional cart (e.g., so that the first worker can continue working to pick or place items); ii) the time required for the second worker to complete the next task (which could be different based on the second worker's individual characteristics such as height which might be different from the physical characteristics of the first worker); and/or iii) an additional autonomous vehicle cost associated with a time period during which one or more robots may be unaccompanied or out of use to implement the handover (e.g., a period of time the first robotic cart may be idle waiting for the second worker to takeover and/or a time period the additional cart may be idle waiting for the first worker to take over use of the additional robotic cart).

In various embodiments the costs C1 and/or C2 are generated using one or more additive or additional weight values used to reflect potential costs associated with a handover including potential delays associated with completing the set of tasks assigned to the first cart and/or a weight used to factor in the cost of the first worker changing position to the second location if the handover is not implemented, where this cost would be negative if the second location is a preferred location from the perspective of achieving worker distribution or positive if the second location is a preferred location for the first worker from a worker distribution perspective.

In some embodiments C1 can be expressed as a sum as follows:

C1=Sum of ((T1 (time for first worker (W1) to move from the first location (L1) to the second location (L2))+ optionally one or more of i) a cost metric based on the time for first worker (W1) to complete the next task at second location (L2); ii) a weight based on the priority of the ongoing list of operations associated with the first cart (e.g., priority of order to which the first mobile cart corresponds-note that for a high priority order this weight would be negative to decrease the probability of a handoff which might increase overall time for the first list of operations to be completed); iii) a weight based on the effect (a negative weight if good effect, a positive weight if bad effect) of having the first worker (W1) reposition to second location (L2) thereby changing the worker distribution in the warehouse where the first autonomous vehicle is being used; and iv) a cost function based on whether the first worker (W1) will cross a zone boundary in a warehouse where zones are defined, e.g., with a weight associated with a zone boundary crossing being positive reflecting an increased cost to thereby discourage movement of workers between zones).

In some embodiments C2 can be expressed as a sum as follows:

C2=a value (T2) representing the time required for an additional (e.g., second) worker (W2) to travel to the second location (L2) plus one, more or all of the following: i) the time for the second worker (W2) to login and take over operation of the first autonomous vehicle; ii) the time for the second worker (W2) to perform the next task associated with the first autonomous vehicle at the second location (L2); iii) the time required to the first worker (W1) to meet up with an additional autonomous vehicle and begin performing operations with the additional autonomous vehicle (this may include login times); iv) a weight associated with the first or second worker (W1 or W2) making an error during the handover, e.g., a navigation error delaying one of the first and second workers (W1 or W2) meeting with the first or additional autonomous vehicle within an expected amount of time; and v) a robotic cost in terms of an amount of time the first autonomous vehicle or a second autonomous vehicle will go unused due to a time period associated with a handover that would not occur if the handover was not performed.

The times and/or costs used in computing the above cost values are expressed as numbers. This allows the cost components to be added or weighted without regard to the units (e.g., seconds or other type of units) the individual cost components correspond to or otherwise represent.

While explained in the context of a robotic cart used for pick or stocking operations, the methods and apparatus of the invention relating to worker assignment to autonomous vehicles are applicable to a wide range of applications where an autonomous vehicle is assigned a series of location specific tasks which involve a human worker. For example, in manufacturing operations an autonomous vehicle may transport an item being assembled between a plurality of workstations with a worker being responsible for one or more tasks at each workstation. The methods and apparatus of the invention can be, and sometimes are, used in such embodiments to determine when a worker should stay with the autonomous vehicle and assist in the operations at various workstations and/or when the autonomous vehicle should be handed off to another worker. In the case of the handoff the new worker replaces the initial worker associated with the autonomous vehicle and performs one or more additional location dependent tasks, e.g., item assembly operations.

FIG. 5 shows how FIGS. 5A, 5B and 5C can be combined to form the full example order processing and autonomous vehicle control routine 500 used in some embodiments.

Steps shown in FIG. 5 are implemented by the order processing control system 122 or 400 and/or robotic cart 138 assigned to a pick list. The order processing and autonomous vehicle control routine 500 starts in start step 502 with the routine being executed by processor 402.

Operation proceeds from step 502 to step 504, in which one or more orders are received, e.g., from customer devices 108, 110. Then, in step 506, items corresponding to one or more orders are allocated to a pick list, e.g., a first pick list such as the one shown in FIG. 3. After the allocation of items to the pick list, in step 508 location information for the items is determined, e.g., from stored warehouse location information 472 which includes information about the warehouse layout and locations of stored items. By including the location information with ordered item identification information and item quantity information a complete pick list, e.g., a first pick list, is generated in step 508. In step 510, the pick list generated in step 508 is stored in memory, e.g., so that it can be assigned to a robotic cart.

Operation proceeds from step 510 to step 512 in which the generated pick list is assigned to an autonomous vehicle, e.g., a first robotic cart. The pick list is a list of location dependent operations, e.g., pick operations, with location information about where the operations are to be performed.

In step 513 a worker, e.g., a first worker is assigned to the first robotic cart, e.g., to perform one or more operations on the pick list that was assigned to the first robotic cart. Accordingly, at the end of step 513 the generated, e.g., first, pick list, first worker 136 and first robotic cart 138 are associated with each other. Operation proceeds from step 513 to step 514 wherein the first pick list, first cart information and assigned worker information are stored in memory 410, e.g., as a set of combined pick list, robotic cart and worker assignment information 471.

In step 516 the assignment information is communicated to the first robotic cart and/or first worker so that they know they are to work together on completing one or more items on the first pick list. Communication to the first worker may be via a radio headset, wireless pad device, cell phone or other communication device and/or the display or audio output device of one of the robotic carts. In this way the first worker is informed of his assignment to the first robotic cart and optimally where the worker needs to go to meet up with and log in to the first robotic cart.

Then in step 518 the first robotic cart is controlled to travel to an initial location, e.g., the first pick location in the pick list. This control can be and sometimes is simply by the control device specifying the location in the pick list with the robotic cart processor being configured to access the pick list and use it to determine the location to which the robotic cart should move and/or by an explicit move command from the control system 122.

Operation proceeds from step 518 to step 524 of FIG. 5B via connecting node A 520. In step 524 the first robotic cart 138 is operated to display pick information to the worker while at the pick location. In the case of the first instance of step 524 this step will be performed at the first pick location in the assigned pick list. However, in subsequent iterations of step 524 the displaying of pick information will be at subsequent pick locations, e.g., the second, third or some other pick location on the pick list. In step 526 a determination is made if a worker, and thus robotic cart, handover should be implemented for the next pick operation on the pick list. Step 526 involves a call to a handover determination subroutine such as the one shown in FIG. 6. The handover determination subroutine 600 returns an indication whether a handover is to be implemented or if the current worker associated with the robotic cart, e.g., the first worker associated with the first robotic cart should continue to work with the cart and move to the next pick location.

In step 528 completion of a pick operation at the current pick location is detected. This operation may correspond to the robotic pick cart 138 detecting placement of the items which were to be picked at a location on the robotic cart and/or to an operator input, e.g., touch of a bottom on the cart screen signaling pick completion at a location. The completion of the pick of items at a location is signaled by the cart 138 to the control system 122. The completion of the pick of items at a location is detected at the control system based on the signal or information sent by the robotic cart 138.

With the completion of the pick operations at the current location having been detected at step 528 operation proceeds from step 528 to step 538 (shown in FIG. 5C) via connecting node B 536.

In step 538 the first robotic cart is controlled to take an action based on the determination that a robotic cart handover should be implemented. Step 538 in various embodiments includes a number of sub steps including step 540 in which a check is made as to whether a handover is to be implemented. This involves checking, at the robotic cart 138 or control system 122, whether the determination was made that a handover should be performed as part of moving to the next pick location or if the current worker working with the robotic cart 138 should continue working with the robotic cart 138 and move to the next pick location. If in step 540 it is determined that a handover is not to be implemented, operation proceeds to step 542 in which the robotic cart is operated to output a worker notification instructing the worker working with the robotic cart 138 to move to the next, e.g., second, pick location. Then, in step 546 the robotic cart 138 is operated to automatically proceed to the next pick location with the worker.

Operation proceeds from step 546, via connecting node C 566, to step 524 where the robotic cart provides pick information to the worker, e.g., at the location to which the robotic cart 138 moved. By iterating through step 524 and the other steps a handover can be considered before each possible robotic cart moves to a new pick location.

If in step 540 the check reveals that the decision was that a handover should be implemented, e.g., the first robotic cart should be handed off in an automated fashion to a second worker 156, then operation proceeds from step 540 to step 548. In step 548 the control system 122 assigns a second worker 156 to the first robotic cart 138. Then operation proceeds to step 550. In step 550 the first robotic cart 138 is routed to a meeting location where the second worker 156 can log in to the robotic cart 138 before proceeding to work using the cart 138. In step 550 the first robotic cart is controlled to automatically move to the meeting location which can be a cart parking area, e.g. on the second workers way to the next pick location, or the second pick location whichever is more efficient.

Step 550 includes in some embodiments decision step 552 in which a check is made as to whether the first robotic cart is to meet the new, e.g., second worker 156 at a meeting location prior to the first robotic cart reaching the next, e.g., second, pick location. If the first robotic cart is to meet the second worker 156 at a meeting location on the way to the next pick location operation proceeds to step 556 in which the first robotic cart 136 is operated to automatically proceed to the meeting location, e.g., without the first worker. Then in step 558, e.g., after reaching the meeting location which may be a cart parking area near the next pick location, the first robotic cart requires the new, e.g. second, worker to complete a worker login procedure after meeting up with the first robotic cart and before the cart moves from the meeting location to the next pick location. Once the second worker has completed the login at the meeting location, the first robotic cart in step 560 guides and travels with the second worker 156 to the next pick location. Operation proceeds from step 560 to step 524 via connecting node C 566.

In step 552 if it was determined that the first robotic cart was not to meet the new, e.g., second worker, at a meeting location prior to the robotic cart reaching the next pick location operation proceeds to step 562. In step 562 the robotic cart 138 is controlled to proceed automatically to the next pick location which is used as the meeting location for the first robotic cart 138 to meet the second worker 156.

Operation proceeds from step 562 to step 564 in which the first robotic cart is operated to require the second worker to log in and complete the login after the second worker 156 meets the robotic cart.

Whether the meeting location is before or at the second pick location, a handover involves a second worker cart login operation that takes some amount of worker time that would not be required if the first worker remained with the cart and a handoff had not been implemented. Accordingly, it should be appreciated that second worker login time is a worker time cost that should be factored into and considered when deciding whether to implement a handoff or not.

By returning to step 524 a loop is performed in which pick operations will be performed after each move to a new pick operation and decisions whether a handover should occur can be made and considered with each move of the robotic cart 138.

FIG. 6 shows the steps of an example handover determination routine that can be, and sometimes is, called by the example order processing and autonomous vehicle control routine shown in the other figures of this application.

FIG. 6 is a flowchart 600 of an example handover determination method implemented by a handover determination routine. The steps of example handover determination method are implemented by control system 122 or 400, e.g., under the control of processor 402.

Operation of the handover determination method starts in step 602, e.g., in response to call from step 526 of flowchart 500 of the main routine of flowchart 500. Operation proceeds from start step 602 to step 604. In step 604 the control system accesses information indicating the location of one or more workers, said one or more workers including a second worker. Operation proceeds from step 604 to step 606. In step 606 the control system accesses task location information, e.g., pick list information, indicating a first location where a first operation associated with a first autonomous vehicle, e.g., a first robotic cart, is to be performed and a second location where a second operation associated with the first autonomous vehicle is to be performed. Operation proceeds from step 606 to step 608.

In step 608 the control system determines whether a worker handover (e.g., an assignment of an operation or a set of operations to be performed in association with an autonomous vehicle from one human picker or worker to another) for the second operation should be implemented based on a first estimated time cost for a first worker associated with the first autonomous vehicle at said first location for performing the second operation with the first autonomous vehicle and a second estimated time cost for a second worker not associated with the first autonomous vehicle at said first location for performing the second operation with the first autonomous vehicle. In some embodiments, the first estimated time cost is based on at least a time for the first worker to travel with the first autonomous vehicle to the second location.

In some but not necessarily all embodiments, the second estimated time cost is based on at least a time for the first autonomous vehicle to travel unaccompanied at least a portion of the way from the first location to meet the second worker.

Step 608 includes steps 610, 614, 620, 622, 624 and 626. In step 610 the control system determines a first cost value based on at least the amount of time required for the first worker assigned to the first autonomous vehicle to travel from the first location to the second location. In some embodiments, step 610 includes step 612, in which the control system determines the first cost value based on one or more of all of: i) a cost metric based on the time for the first worker (W1) to complete the second operation (e.g., task) at the second location; ii) a weight based on the priority of the ongoing list of operations associated with the first autonomous vehicle (e.g., priority of order to which the first autonomous vehicle corresponds-note that for a high priority order this weight would be negative to decrease the probability of a handoff which might increase overall time for the first list of operations to be completed); iii) a weight based on the effect (e.g., a negative weight if good effect, a positive weight if bad effect) of having the first worker reposition to the second location, thereby changing the worker distribution in the warehouse where the first autonomous vehicle is being used; and iv) a cost function based on whether the first worker will cross a zone boundary in a warehouse, where zones are defined (e.g., with a weight associated with a zone boundary crossing being positive reflecting an increased cost to thereby discourage movement of workers between zones). Operation proceeds from step 610 to step 614.

In step 614 the control system determines a second cost value based on at least the second amount of time required for the second worker to travel to the second location. In some embodiments, step 614 includes one or both of step 616 and step 618. In step 616, the control system determines the second cost value based on one, multiple, or all of the following: i) the time for the second worker to login and take over operation of the first autonomous vehicle; ii) the time for the second worker to perform the next task associated with the first autonomous vehicle at the second location; and iii) the time required to the first worker to meet up with an additional autonomous vehicle and begin performing operations with the additional autonomous vehicle (this may include login times). In step 618, the control system determines the second cost value based on one, multiple or all of: i) a weight associated with the first or second worker making an error during the handover, e.g., a navigation error delaying one of the first and second workers meeting with the first or additional autonomous vehicle within an expected amount of time; and ii) a robotic cost in terms of an amount of time either of the first autonomous vehicle or the additional autonomous vehicle go unused due to a time period associated with a handover that would not occur if the handover was not performed.

Operation proceeds from step 614 to step 620. In step 620, the control system compares the first cost value to the second cost value. If the first cost value is greater than the second cost value, then operation proceeds from step 620 to step 622, in which the control system makes a decision to implement a handover. However, if the first cost value is not greater than the second cost value, then operation proceeds from step 620 to step 624, in which the control system makes a decision not to implement a handover. Operation proceeds from step 622 or step 624, to step 626, in which the control system returns the handover decision to the main routine.

Various embodiments are directed to a decision making system, e.g., a system for making worker to robotic pick cart assignment decisions. In some embodiments the work assignments are on a per autonomous vehicle and task location basis, e.g., with a decision as to whether a worker handoff should be implemented for each time an autonomous vehicle will change locations to complete tasks on a location dependent task list assigned to the autonomous vehicle. In some embodiments the assignment logic determines the total worker, e.g., picker, time that will be used at each pick (e.g., a set of one or more pick operations at a task location) to select worker assignments that minimize the total picker time used to complete a location dependent task list and/or achieves one or more other objectives such as a preferred distribution of workers in a warehouse. This can be, and sometimes is, accomplished by calculating the difference in time that will be required between staying with the current picker, e.g., continuing to keep the current worker assigned to a mobile pick cart or implementing a handoff, e.g., assigning a second picker, e.g., worker, for the next pick to be performed with the robotic cart.

The system allows individual workers operating as pickers to operate in general zones that can dynamically change the area of an individual's worker's zone, e.g., area of operation, based on the contextual composition of a pick list. While zones may be used in some embodiments, the methods do not require the use of zones.

In one example embodiment a robotic cart goes from pick location to pick location with a person and/or autonomously moves between pick locations. When a cart moves between locations without a worker, a worker meets the pick location to which the cart is moving or at a point along the route to the new location. In this way a handoff of the cart is implemented leaving the worker previously working with the cart with the task of meeting another cart and continue to perform picks with the new cart. Thus a person may move with the cart for some portions of a location pick list. However when a handoff is made during implementation of a pick list, the robotic cart normally travels without a person for some portion of the route and meets a person at the next pick location or on the way to the next pick location. Consider for example an example case where there are four picks, A, B, C and D assigned to a first robotic cart where each of the four picks corresponds to a different location. The robotic cart leads a first worker initially assigned to perform picks with the first cart from pick location A, then to pick location B, etc. This is generally how the robot carts work for most applications. However, a handoff can be, and sometimes is, implemented at some point during implementation of a task list if it is efficient to do so.

In the case of strict zone picking a handoff is implemented when the robotic cart crosses a zone boundary. Forced handoffs at strict zone boundaries in all cases can prevent people from walking all the way across a warehouse a lot but can be wasteful and/or have other adverse effects as previously discussed.

The dynamic handoff decision making implemented in accordance with the invention can efficiently decide when a handoff should be implemented avoiding issues that exist with strict zone based handoffs. In accordance with the invention, in some embodiments for one or more picks, the system, e.g., a control system, looks at and determines how much time it will take an associate to go from the current pick to the next pick. This is used to generate a first cost metric which equals or is a function of the determined amount of time. If the first cost metric is greater than a second cost metric that is based on one or more costs associated with a handoff of the mobile robotic cart to a second worker, a handoff will be implemented. The second cost metric is based on, e.g., a function of the time it takes a first worker currently assigned to the robotic cart being used to go find a new robot and log in to continue working and the additional time another worker, e.g., worker 2 will spend to meet and log into the first robotic cart that was being used by worker 1. If cart idle time will be involved with a handoff this maybe and sometimes is included as a handoff cost but with a lesser impact than work time, e.g., with each unit of cart idle time contributing a fraction, e.g., $\frac{1}{10}$, of a corresponding unit of worker time to the estimated handoff cost. Thus, in the automated decision process, the cost of a first worker remaining with an autonomous vehicle and continuing to perform tasks associated with that device is compared to the cost of a change in workers assigned to work with the first autonomous vehicle. The automated decision to implement a handoff effectively creates a "virtual zone" from the perspective of an individual worker or set of works which is dynamic in size based on the cost of handoffs and which can change over time. This can lead to efficiencies over strict fixed zone systems.

Consider for example one example case in which a first worker, named John, is assigned to a first robotic cart, e.g., RC1, in a warehouse with 4 products corresponding to different locations in the first robotic cart's pick list. The system calculates that as the first worker, John, goes through the pick list, whether it would be more time-efficient for the first robotic cart to stay with the first worker John or meet up with a second worker, e.g., Rob, in another area of the warehouse to perform a pick on the pick list after John completes one of the picks on the pick list associated with the first robotic cart. The goal is to minimize the amount of total picker time needed to complete the pick list while also minimizing worker time wasted due to mobile cart handoffs. In one example, the control system determines based on the relative costs (e.g., time) associated with the first worker staying with the first robotic cart vs. the cost of a handoff, that after 3 products are picked, that it would be more efficient to meet up with the second worker, Rob, at a pick location or on the way to a pick location on the list, e.g., the pick location of the item 4 rather than stay with the first worker, John. In one such embodiment, the robotic cart is programmed to automatically travel between the last pick location where the third pick is made by the first worker to the fourth pick location where the second worker is to pick the fourth item and place it on the robotic cart. Along the path between the third and fourth item pick locations or at the fourth pick location the robotic cart may stop and wait for the second worker, Rob, to meet the cart and login. Since the cart is able to wait for the second worker, the second worker does not have idle time between pick assignments and can complete whatever assignment he is working on before meeting the first robotic cart. To the extent that the first robotic cart will be idle during a handoff, the anticipated amount of time the cart will be idle can be taken into consideration as a handoff cost and added to a time related cost used in estimating the cost of the handoff. However, since cart idle time is often a relatively small cost as compared to the cost of worker time, in some embodiments, cart idle time is not factored into the cost of a handoff.

The worker to robotic cart assignment process of the invention can and sometimes does result in decoupling of a worker, e.g., picker, from the mobile autonomous vehicle, e.g., item hauler used to transport items picked by the worker associated with the mobile autonomous vehicle.

In one example embodiment the invention may result in a work/robotic cart assignment and operation flow as follows:

1) Associate 1 meets the robot and goes to pick A. When she is done, the robot figures that it will take 65 seconds to get to pick B. Alternately, it will take the Associate 1 60 seconds to get to another robot and log in and another 40 seconds for an associate to get to this robot and log in. 65 seconds<100 seconds (60+40) so we move onto pick B with Associate 1.
2) Associate 1 goes to pick B. When she is done, the robot figures that it will take 40 seconds to get to pick C. Alternately, it will take Associate 1 70 seconds to get to another robot and log in and another 50 seconds for an associate to get to this robot and log in. 40 seconds<120 seconds (70+50) so we move onto pick C with Associate 1.
3) Associate 1 goes to pick C. When she is done, the robot figures that it will take 240 seconds to get to pick D. Alternately, it will take Associate 1 50 seconds to get to another robot and log in and another 40 seconds for an associate to get to this robot and log in. 240 seconds<90 seconds (50+40) so we will have Associate 1 go find a new robot and this robot will go to meet Associate 2.
4) Associate 1 meets the robot and goes to pick D. When the associate is done all the work is done and they go to find another robot. This robot will then go to the correct takeoff location(s).

Figure 7:
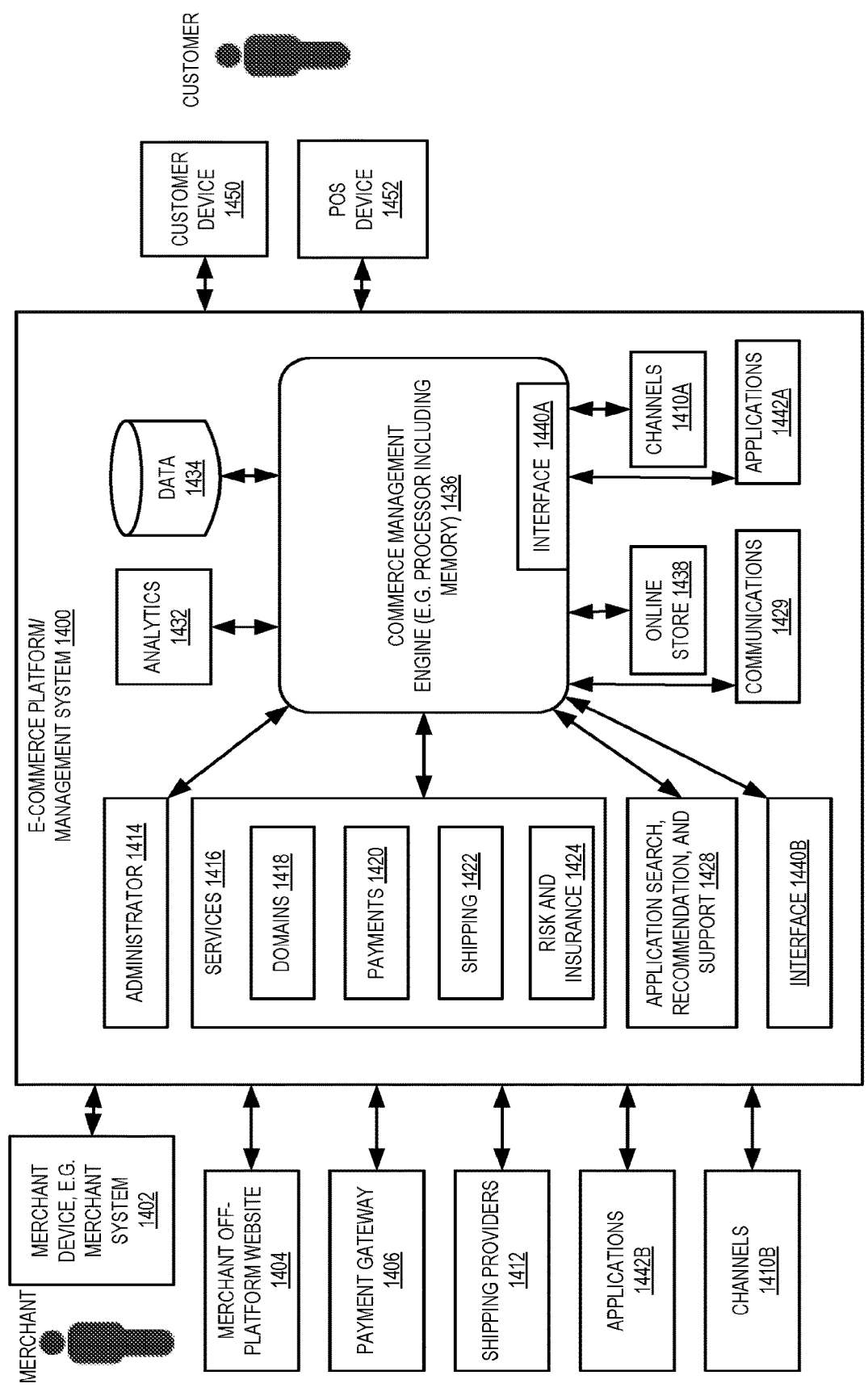
FIG. 7 is a diagram of a system in which the management system of FIG. 1 is implemented as part of an e-commerce platform which provides merchant products and services to customers, and example systems, websites, devices, providers, applications and channels which interact with the e-commerce platform/management system.

With reference to FIG. 7, an embodiment in which the order processing and control system 122 shown in FIG. 1 is implemented as part of an e-commerce platform 1400 that provides merchant products and services to customers. Thus, in some embodiments, the e-commerce system implements the steps of the method shown in FIGS. 5 and 6 in addition to performing various other functions. While in some embodiments the features and components of the control system 122 are incorporated into the e-commerce platform 1400, it should be appreciated that the methods and apparatus described herein are in no way limited to e-commerce embodiments and can be used in a wide range of applications including, for example, warehouse systems which do not involve or relate to e-commerce.

While the disclosure contemplates using the apparatus, system, and process related to the e-commerce system to purchase products and services, for simplicity the description herein will refer to products. All references to products throughout this disclosure should also be understood to be references to products and/or services, including physical products, digital content, tickets, subscriptions, services to be provided, and the like.

While the disclosure contemplates that a 'merchant' and a 'customer' may be more than individuals, for simplicity the following description may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 1400 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 1400 for potential use in marketing and selling products, and the like), a service provider user (e.g., a shipping provider 1412, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 1400 may provide a centralized system for providing merchants with online resources and facilities for managing their business. The facilities described herein may be deployed in part or in whole through a machine that executes computer software, modules, program codes, and/or instructions on one or more processors which may be part of or external to the platform 1400. Merchants may utilize the e-commerce platform 1400 for managing commerce with customers, such as by implementing an e-commerce experience with customers through an online store 1438, through channels 1410A-B, through POS devices 1452 in physical locations (e.g., a physical storefront or other location such as through a kiosk, terminal, reader, printer, 3D printer, and the like), by managing their business through the e-commerce platform 1400, and by interacting with customers through a communications facility 1429 of the e-commerce platform 1400, or any combination thereof. A merchant may utilize the e-commerce platform 1400 as a sole commerce presence with customers, or in conjunction with other merchant commerce facilities, such as through a physical store (e.g., 'brick-and-mortar' retail stores), a merchant off-platform website 1404 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 1452 in a physical store of a merchant are linked into the e-commerce platform 1400, where a merchant off-platform website 1404 is tied into the e-commerce platform 1400, such as through 'buy buttons' that link content from the merchant off platform website 1404 to the online store 1438, and the like.

The online store 1438 may represent a multitenant facility comprising a plurality of virtual storefronts. In embodiments, merchants may manage one or more storefronts in the online store 1438, such as through a merchant device 1402 (e.g., computer, laptop computer, mobile computing device, and the like), and offer products to customers through a number of different channels 1410A-B (e.g., an online store 1438; a physical storefront through a POS device 1452; electronic marketplace, through an electronic buy button integrated into a website or social media channel such as on a social network, social media page, social media messaging system; and the like). A merchant may sell across channels 1410A-B and then manage their sales through the e-commerce platform 1400, where channels 1410A may be provided internal to the e-commerce platform 1400 or from outside the e-commerce channel 1410B. A merchant may sell in their physical retail store, at pop ups, through wholesale, over the phone, and the like, and then manage their sales through the e-commerce platform 1400. A merchant may employ all or any combination of these, such as maintaining a business through a physical storefront utilizing POS devices 1452, maintaining a virtual storefront through the online store 1438, and utilizing a communication facility 1429 to leverage customer interactions and analytics 1432 to improve the probability of sales. Throughout this disclosure the terms online store 1438 and storefront may be used synonymously to refer to a merchant's online e-commerce offering presence through the e-commerce platform 1400, where an online store 1438 may refer to the multitenant collection of storefronts supported by the e-commerce platform 1400 (e.g., for a plurality of merchants) or to an individual merchant's storefront (e.g., a merchant's online store).

In embodiments, a customer may interact through a customer device 1450 (e.g., computer, laptop computer, mobile computing device, and the like), a POS device 1452 (e.g., retail device, a kiosk, an automated checkout system, and the like), or any other commerce interface device known in the art. The e-commerce platform 1400 may enable merchants to reach customers through the online store 138, through POS devices 1452 in physical locations (e.g., a merchant's storefront or elsewhere), to promote commerce with customers through dialog via electronic communication facility 1429, and the like, providing a system for reaching customers and facilitating merchant services for the real or virtual pathways available for reaching and interacting with customers.

In embodiments, and as described further herein, the e-commerce platform 1400 may be implemented through a processing facility including a processor and a memory, the processing facility storing a set of instructions that, when executed, cause the e-commerce platform 1400 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 1400, merchant devices 1402, payment gateways 1406, application developers, channels 1410A-B, shipping providers 1412, customer devices 1450, point of sale devices 1452, and the like. The e-commerce platform 1400 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 1400 may be implemented to operate on various platforms and operating systems, such as iOS, Android, on the web, and the like (e.g., the administrator 1414 being implemented in multiple instances for a given online store for IOS, Android, and for the web, each with similar functionality).

In embodiments, the online store 1438 may be served to a customer device 1450 through a webpage provided by a server of the e-commerce platform 1400. The server may receive a request for the webpage from a browser or other application installed on the customer device 1450, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 1450 and then the template language is replaced by data from the online store 1438, such as when a theme is installed. The template and themes may consider tags, objects, and filters. The client device web browser (or other application) then renders the page accordingly.

In embodiments, online stores 1438 may be served by the e-commerce platform 1400 to customers, where customers can browse and purchase the various products available (e.g., add them to a cart, purchase immediately through a buy-button, and the like). Online stores 1438 may be served to customers in a transparent fashion without customers necessarily being aware that it is being provided through the e-commerce platform 1400 (rather than directly from the merchant). Merchants may use a merchant configurable domain name, a customizable HTML theme, and the like, to customize their online store 1438. Merchants may customize the look and feel of their website through a theme system, such as where merchants can select and change the look and feel of their online store 1438 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 1438, such as through blogs, articles, and the like, as well as configure navigation menus. Merchants may upload images (e.g., for products), video, content, data, and the like to the e-commerce platform 1400, such as for storage by the system (e.g. as data 1434). In embodiments, the e-commerce platform 1400 may provide functions for resizing images, associating an image with a product, adding and associating text with an image, adding an image for a new product variant, protecting images, and the like.

As described herein, the e-commerce platform 1400 may provide merchants with transactional facilities for products through a number of different channels 1410A-B, including the online store 1438, over the telephone, as well as through physical POS devices 1452 as described herein. The e-commerce platform 1400 may include business support services 1416, an administrator 1414, and the like associated with running an on-line business, such as providing a domain service 1418 associated with their online store, payment services 1420 for facilitating transactions with a customer, shipping services 1422 for providing customer shipping options for purchased products, risk and insurance services 1424 associated with product protection and liability, merchant billing, and the like. Services 1416 may be provided via the e-commerce platform 1400 or in association with external facilities, such as through a payment gateway 1406 for payment processing, shipping providers 1412 for expediting the shipment of products, and the like.

In embodiments, the e-commerce platform 1400 may provide for integrated shipping services 1422 (e.g., through an e-commerce platform shipping facility or through a third-party shipping carrier), such as providing merchants with real-time updates, tracking, automatic rate calculation, bulk order preparation, label printing, and the like.

Figure 8:
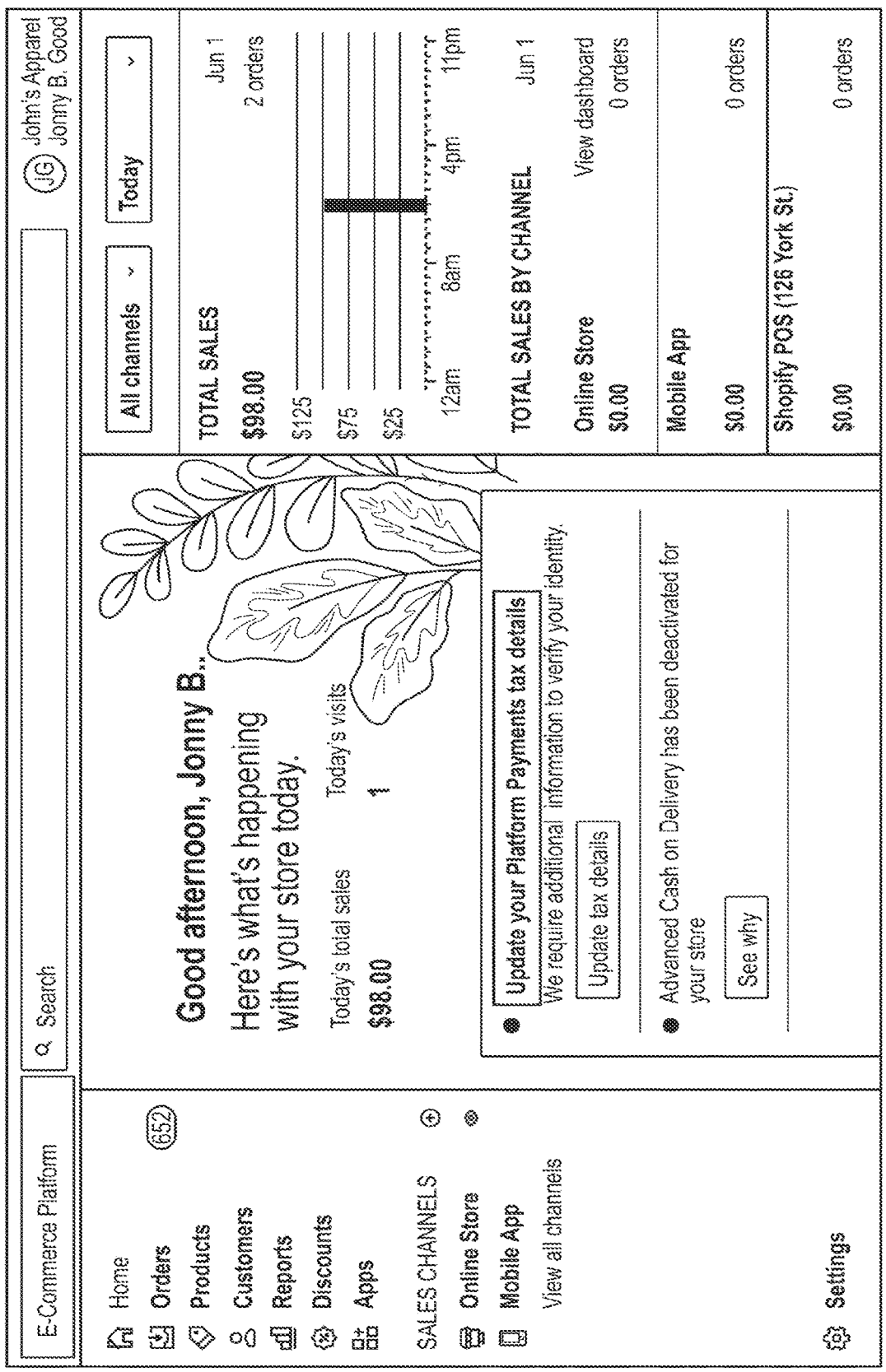
FIG. 8 depicts a non-limiting embodiment for a home page of an administrator, which may show information about daily tasks, a store's recent activity, and the next steps a merchant can take to build their business.

FIG. 8 depicts a non-limiting embodiment for a home page of an administrator 1414, which may show information about daily tasks, a store's recent activity, and the next steps a merchant can take to build their business. In embodiments, a merchant may log in to administrator 1414 via a merchant device 1402 such as from a desktop computer or mobile device, and manage aspects of their online store 1438, such as viewing the online store's 1438 recent activity, updating the online store's 1438 catalog, managing orders, recent visits activity, total orders activity, and the like. In embodiments, the merchant may be able to access the different sections of administrator 1414 by using the sidebar, such as shown on FIG. 8. Sections of the administrator 1414 may include various interfaces for accessing and managing core aspects of a merchant's business, including orders, products, customers, available reports and discounts. The administrator 1414 may also include interfaces for managing sales channels for a store including the online store, mobile application(s) made available to customers for accessing the store (Mobile App), POS devices, and/or a buy button. The administrator 1414 may also include interfaces for managing applications (Apps) installed on the merchant's account; settings applied to a merchant's online store 1438 and account. A merchant may use a search bar to find products, pages, or other information. Depending on the device 1402 or software application the merchant is using, they may be enabled for different functionality through the administrator 1414. For instance, if a merchant logs in to the administrator 1414 from a browser, they may be able to manage all aspects of their online store 1438. If the merchant logs in from their mobile device (e.g. via a mobile application), they may be able to view all or a subset of the aspects of their online store 1438, such as viewing the online store's 1438 recent activity, updating the online store's 1438 catalog, managing orders, and the like.

More detailed information about commerce and visitors to a merchant's online store 1438 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 1410A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 1438, such as based on account status, growth, recent customer activity, and the like. Notifications may be provided to assist a merchant with navigating through a process, such as capturing a payment, marking an order as fulfilled, archiving an order that is complete, and the like.

The e-commerce platform 1400 may provide for a communications facility 1429 and associated merchant interface for providing electronic communications and marketing, such as utilizing an electronic messaging aggregation facility for collecting and analyzing communication interactions between merchants, customers, merchant devices 1402, customer devices 1450, POS devices 1452, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 1429 analyzes the interaction and provides analysis to the merchant on how to improve the probability for a sale.

The e-commerce platform 1400 may provide a financial facility 1420 for secure financial transactions with customers, such as through a secure card server environment. The e-commerce platform 1400 may store credit card information, such as in payment card industry data (PCI) environments (e.g., a card server), to reconcile financials, bill merchants, perform automated clearing house (ACH) transfers between an e-commerce platform 1400 financial institution account and a merchant's bank account (e.g., when using capital), and the like. These systems may have Sarbanes-Oxley Act (SOX) compliance and a high level of diligence required in their development and operation. The financial facility 1420 may also provide merchants with financial support, such as through the lending of capital (e.g., lending funds, cash advances, and the like) and provision of insurance. In addition, the e-commerce platform 1400 may provide for a set of marketing and partner services and control the relationship between the e-commerce platform 1400 and partners. They also may connect and onboard new merchants with the e-commerce platform 1400. These services may enable merchant growth by making it easier for merchants to work across the e-commerce platform 1400. Through these services, merchants may be provided help facilities via the e-commerce platform 1400.

In embodiments, online store 1438 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 1400. In embodiments, the e-commerce platform 1400 may store this data in a data facility 1434. The transactional data may be processed to produce analytics 1432, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 1400 may store information about business and merchant transactions, and the data facility 1434 may have many ways of enhancing, contributing, refining, and extracting data, where over time the collected data may enable improvements to aspects of the e-commerce platform 1400.

Referring again to FIG. 7, in embodiments the e-commerce platform 100 may be configured with a commerce management engine 1436 for content management, task automation and data management to enable support and services to the plurality of online stores 1438 (e.g., related to products, inventory, customers, orders, collaboration, suppliers, reports, financials, risk and fraud, and the like), but be extensible through applications 1442A-B that enable greater flexibility and custom processes required for accommodating an ever-growing variety of merchant online stores, POS devices, products, and services, where applications 1442A may be provided internal to the e-commerce platform 1400 or applications 1442B from outside the e-commerce platform 1400. In embodiments, an application 1442A may be provided by the same party providing the platform 1400 or by a different party. In embodiments, an application 1442B may be provided by the same party providing the platform 1400 or by a different party. The commerce management engine 1436 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 1414 and/or the online store 1438.

The commerce management engine 1436 includes base or "core" functions of the e-commerce platform 1400, and as such, as described herein, not all functions supporting online stores 1438 may be appropriate for inclusion. For instance, functions for inclusion into the commerce management engine 1436 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 1438 (e.g., functions that can be re-used/modified across core functions), limited to the context of a single online store 1438 at a time (e.g., implementing an online store 'isolation principle', where code should not be able to interact with multiple online stores 1438 at a time, ensuring that online stores 1438 cannot access each other's data), provide a transactional workload, and the like. Maintaining control of what functions are implemented may enable the commerce management engine 1436 to remain responsive, as many required features are either served directly by the commerce management engine 1436 or enabled through an interface 1440A-B, such as by its extension through an application programming interface (API) connection to applications 1442A-B and channels 1410A-B, where interfaces 140A may be provided to applications 1442A and/or channels 1410A inside the e-commerce platform 1400 or through interfaces 1440B provided to applications 1442B and/or channels 1410B outside the e-commerce platform 100. Generally, the platform 1400 may include interfaces 1440A-B (which may be extensions, connectors, APIs, and the like) which facilitate connections to and communications with other platforms, systems, software, data sources, code and the like. Such interfaces 1440A-B may be an interface 1440A of the commerce management engine 1436 or an interface 1440B of the platform 1400 more generally. If care is not given to restricting functionality in the commerce management engine 1436, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 1436 may be configured to maintain responsiveness, such as through configuration that utilizes timeouts, queues, backpressure to prevent degradation, and the like.

Although isolating online store data is important to maintaining data privacy between online stores 1438 and merchants, there may be reasons for collecting and using cross-store data, such as for example, with an order risk assessment system or a platform payment facility, both of which require information from multiple online stores 1438 to perform well. In embodiments, rather than violating the isolation principle, it may be preferred to move these components out of the commerce management engine 1436 and into their own infrastructure within the e-commerce platform 1400.

In embodiments, the e-commerce platform 1400 may provide for a platform payment facility 1420, which is another example of a component that utilizes data from the commerce management engine 1436 but may be located outside so as to not violate the isolation principle. The platform payment facility 1420 may allow customers interacting with online stores 1438 to have their payment information stored safely by the commerce management engine 1436 such that they only have to enter it once. When a customer visits a different online store 1438, even if they've never been there before, the platform payment facility 1420 may recall their information to enable a more rapid and correct check out. This may provide a cross-platform network effect, where the e-commerce platform 1400 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 1438. It would be difficult and error prone for each online store 1438 to be able to connect to any other online store 1438 to retrieve the payment information stored there. As a result, the platform payment facility may be implemented external to the commerce management engine 1436.

For those functions that are not included within the commerce management engine 1436, applications 1442A-B provide a way to add features to the e-commerce platform 1400. Applications 1442A-B may be able to access and modify data on a merchant's online store 1438, perform tasks through the administrator 1414, create new flows for a merchant through a user interface (e.g., that is surfaced through extensions/API), and the like. Merchants may be enabled to discover and install applications 1442A-B through application search, recommendations, and support 1428. In embodiments, core products, core extension points, applications, and the administrator 1414 may be developed to work together. For instance, application extension points may be built inside the administrator 1414 so that core features may be extended by way of applications, which may deliver functionality to a merchant through the extension.

In embodiments, applications 1442A-B may deliver functionality to a merchant through the interface 1440A-B, such as where an application 1442A-B is able to surface transaction data to a merchant (e.g., App: "Engine, surface my app data in mobile and web admin using the embedded app SDK"), and/or where the commerce management engine 1436 is able to ask the application to perform work on demand (Engine: "App, give me a local tax calculation for this checkout").

Applications 1442A-B may support online stores 1438 and channels 1410A-B, provide for merchant support, integrate with other services, and the like. Where the commerce management engine 136 may provide the foundation of services to the online store 1438, the applications 1442A-B may provide a way for merchants to satisfy specific and sometimes unique needs. Different merchants will have different needs, and so may benefit from different applications 1442A-B. Applications 1442A-B may be better discovered through the e-commerce platform 1400 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 1442A-B may be connected to the commerce management engine 1436 through an interface 1440A-B, such as utilizing APIs to expose the functionality and data available through and within the commerce management engine 1436 to the functionality of applications (e.g., through REST, GraphQL, and the like). For instance, the e-commerce platform 1400 may provide API interfaces 1440A-B to merchant and partner-facing products and services, such as including application extensions, process flow services, developer-facing resources, and the like. With customers more frequently using mobile devices for shopping, applications 1442A-B related to mobile use may benefit from more extensive use of APIs to support the related growing commerce traffic. The flexibility offered through use of applications and APIs (e.g., as offered for application development) enable the e-commerce platform 1400 to better accommodate new and unique needs of merchants (and internal developers through internal APIs) without requiring constant change to the commerce management engine 1436, thus providing merchants what they need when they need it. For instance, shipping services 1422 may be integrated with the commerce management engine 1436 through a shipping or carrier service API, thus enabling the e-commerce platform 1400 to provide shipping service functionality without directly impacting code running in the commerce management engine 1436.

Many merchant problems may be solved by letting partners improve and extend merchant workflows through application development, such as problems associated with back-office operations (merchant-facing applications 1442A-B) and in the online store 1438 (customer-facing applications 1442A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 1442A-B, through extension/API 1440A-B, help make products easy to view and purchase in a fast growing marketplace. In embodiments, partners, application developers, internal applications facilities, and the like, may be provided with a software development kit (SDK), such as through creating a frame within the administrator 1414 that sandboxes an application interface. In embodiments, the administrator 1414 may not have control over nor be aware of what happens within the frame. The SDK may be used in conjunction with a user interface kit to produce interfaces that mimic the look and feel of the e-commerce platform 1400, such as acting as an extension of the commerce management engine 1436.

Applications 1442A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 1436, such as for synchronizing a local database, notifying an external integration partner, and the like. Update events may enable this functionality without having to poll the commerce management engine 1436 all the time to check for updates, such as through an update event subscription. In embodiments, when a change related to an update event subscription occurs, the commerce management engine 1436 may post a request, such as to a predefined callback URL. The body of this request may contain a new state of the object and a description of the action or event. Update event subscriptions may be created manually, in the administrator facility 1414, or automatically (e.g., via the API 1440A-B). In embodiments, update events may be queued and processed asynchronously from a state change that triggered them, which may produce an update event notification that is not distributed in real-time.

In embodiments, the e-commerce platform 1400 may provide application search, recommendation and support 1428. Application search, recommendation and support 1428 may include developer products and tools to aid in the development of applications, an application dashboard (e.g., to provide developers with a development interface, to administrators for management of applications, to merchants for customization of applications, and the like), facilities for installing and providing permissions with respect to providing access to an application 1442A-B (e.g., for public access, such as where criteria must be met before being installed, or for private use by a merchant), application searching to make it easy for a merchant to search for applications 1442A-B that satisfy a need for their online store 1438, application recommendations to provide merchants with suggestions on how they can improve the user experience through their online store 1438, a description of core application capabilities within the commerce management engine 1436, and the like. These support facilities may be utilized by application development performed by any entity, including the merchant developing their own application 1442A-B, a third-party developer developing an application 1442A-B (e.g., contracted by a merchant, developed on their own to offer to the public, contracted for use in association with the e-commerce platform 1400, and the like), or an application 1442A or 1442B being developed by internal personal resources associated with the e-commerce platform 1400. In embodiments, applications 1442A-B may be assigned an application identifier (ID), such as for linking to an application (e.g., through an API), searching for an application, making application recommendations, and the like.

The commerce management engine 1436 may include base functions of the e-commerce platform 1400 and expose these functions through APIs 1440A-B to applications 1442A-B. The APIs 1440A-B may enable different types of applications built through application development. Applications 1442A-B may be capable of satisfying a great variety of needs for merchants but may be grouped roughly into three categories: customer-facing applications, merchant-facing applications, integration applications, and the like. Customer-facing applications 1442A-B may include online store 1438 or channels 1410A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 1442A-B may include applications that allow the merchant to administer their online store 1438 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 1412 and payment gateways.

In embodiments, an application developer may use an application proxy to fetch data from an outside location and display it on the page of an online store 1438. Content on these proxy pages may be dynamic, capable of being updated, and the like. Application proxies may be useful for displaying image galleries, statistics, custom forms, and other kinds of dynamic content. The core-application structure of the e-commerce platform 1400 may allow for an increasing number of merchant experiences to be built in applications 1442A-B so that the commerce management engine 1436 can remain focused on the more commonly utilized business logic of commerce.

The e-commerce platform 1400 provides an online shopping experience through a curated system architecture that enables merchants to connect with customers in a flexible and transparent manner. A typical customer experience may be better understood through an embodiment example purchase workflow, where the customer browses the merchant's products on a channel 1410A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 1410A-B. A channel 1410A-B is a place where customers can view and buy products. In embodiments, channels 1410A-B may be modeled as applications 1442A-B (a possible exception being the online store 1438, which is integrated within the commence management engine 1436). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 1438 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 1400 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 1410A-B may use the commerce management engine 1436 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 1406 may be provided through a card server environment. In embodiments, the payment gateway 1406 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 1436 may support many other payment methods, such as through an offsite payment gateway 1406 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 1410A-B that do not rely on commerce management engine 1436 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 1436 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 1400 may make the merchant aware of compliance issues with respect to legal obligations (e.g., with respect to taxes). In embodiments, the e-commerce platform 1400 may enable merchants to keep track of changes to the contract of sales over time, such as implemented through a sales model component (e.g., an append-only date-based ledger that records sale related events that happened to an item).

Various illustrative, non-limiting numbered example embodiments will now be discussed with reference to the accompanying drawings. Reference numbers included in the example numbered embodiments are intended to facilitate an understanding of the embodiments and are not intended to limit the embodiments to the particular features shown in the figures to which the reference numbers correspond.

Numbered List of Example Method Embodiments

Method Embodiment 1 A method operating a control system including a processor to control one or more autonomous vehicles, the method comprising: accessing (606) information indicating a first location at which a first operation associated with a first autonomous vehicle is to be performed and a second location where a second operation associated with the first autonomous vehicle is to be performed; determining (608) whether a worker handover (e.g., an assignment of an operation or a set of operations to be performed in association with an autonomous vehicle from one human picker or worker to another) for the second operation should be implemented based on a first estimated time cost for a first worker (W1) associated with the first autonomous vehicle at said first location for performing the second operation with the first autonomous vehicle and a second estimated time cost for a second worker (W2) not associated with the first autonomous vehicle at said first location for performing the second operation with the first autonomous vehicle; and controlling (538) the first autonomous vehicle to take an action based on said determination.

Method Embodiment 1A The method of Method Embodiment 1, wherein the first estimated time cost is based on at least a time for the first worker to travel with the first autonomous vehicle to the second location.

Method Embodiment 1B The method of Method Embodiment 1, wherein the second estimated time cost is based on at least a time for the first autonomous vehicle to travel unaccompanied at least a portion of the way from the first location to meet the second worker.

Method Embodiment 1AA. The method of claim 1, wherein the first estimate time cost and the second estimated time cost are estimated at the time a list of first and second operations is created (e.g., when the work is created).

Method Embodiment 1AB. The method of claim 1, wherein the first estimated time cost is estimated prior to the first operation being completed and wherein the second estimated time cost is estimated after the first operation is completed.

Method Embodiment 2 The method of Method Embodiment 1, wherein controlling (538) the first autonomous vehicle to take an action based on said determination includes: outputting (542) a worker notification to move from the first location to the second location; and routing (550) the autonomous vehicle from the first location to the second location when a worker handover is not to be implemented.

Method Embodiment 3 The method of Method Embodiment 2, wherein controlling (538) the first autonomous vehicle to take an action based on said determination includes: assigning (548) the second operation to the second worker when the determination is a decision to implement a worker handover.

Method Embodiment 4 The method of Method Embodiment 1, wherein said controlling (538) the first autonomous vehicle to take an action based on said determination comprises one or more of: i) routing (550) the first autonomous vehicle to a handover location or ii) operating (558 and/or 564) the first autonomous vehicle to require a login to the first autonomous vehicle by the second worker.

Method Embodiment 4A The method of Method Embodiment 4, wherein the handover location is the second location.

Method Embodiment 5 The method of Method Embodiment 3, wherein said first autonomous vehicle is a first robotic cart.

Method Embodiment 6 The method of Method Embodiment 1, wherein determining (608) whether a worker handover (e.g., an assignment of an operation or a set of operations to be performed in association for the second operation) should be implemented is based on at on at least an amount of time required for a first worker assigned to the first autonomous vehicle to travel from the first location to the second location with the first autonomous vehicle.

Method Embodiment 7 The method of Method Embodiment 6, wherein determining (608) whether a worker handover should be implemented is further based on a second amount of time required for the second worker to travel to the second location.

Method Embodiment 8 The method of Method Embodiment 7, wherein determining (608) whether a worker handover should be implemented includes: determining (610) a first cost value based on at least the amount of time required for the first worker assigned to the first autonomous vehicle to travel from the first location to the second location; and determining (614) a second cost value based on at least the second amount of time required for the second worker to travel to the second location.

Method Embodiment 9 The method of Method Embodiment 8, further comprising, prior to determining (610) the first cost value, performing the steps of: assigning (512) a first list of location dependent tasks to the first autonomous vehicle, said first set of location dependent tasks including a first task to be completed at the first location and a next task to be completed at a second location, said second location being different from said first location; and assigning (513) said first worker to the first autonomous vehicle to perform said first operation at said first location.

Method Embodiment 10 The method of Method Embodiment 8, wherein determining (608) whether a worker handover should be implemented includes: making (622) a decision to implement a handover when the first cost value is greater than the second cost value.

Method Embodiment 11 The method of Method Embodiment 10, wherein the first cost value is (612) further based on one, multiple, or all of: i) a cost metric based on the time for the first worker (W1) to complete the second operation (e.g. task) at the second location; ii) a weight based on the priority of the ongoing list of operations associated with the first autonomous vehicle (e.g., priority of order to which the first autonomous vehicle (e.g., first robotic mobile cart) corresponds-note that for a high priority order this weight would be negative to decrease the probability of a handoff which might increase overall time for the first list of operations to be completed); iii) a weight based on the effect (e.g., a negative weight if good effect, a positive weight if bad effect) of having the first worker reposition to the second location, thereby changing the worker distribution in the warehouse where the first autonomous vehicle is being used; and iv) a cost function based on whether the first worker will cross a zone boundary in a warehouse, where zones are defined, e.g., with a weight associated with a zone boundary crossing being positive reflecting an increased cost to thereby discourage movement of workers between zones).

Method Embodiment 12 The method of Method Embodiment 10, wherein the second cost value is (616) further based on one, multiple or all of the following: i) the time for the second worker to login and take over operation of the first autonomous vehicle; ii) the time for the second worker to perform the next task associated with the first autonomous vehicle at the second location; and iii) the time required to the first worker to meet up with an additional autonomous vehicle and begin performing operations with the additional autonomous vehicle (this may include login times).

Method Embodiment 13 The method of Method Embodiment 11, wherein the second cost value is, (618) further based on one, multiple or all of: i) a weight associated with the first or second worker making an error during the handover, e.g., a navigation error delaying one of the first and second workers meeting with the first or additional autonomous vehicle within an expected amount of time; and ii) a robotic cost in terms of an amount of time either of the first autonomous vehicle or the additional (e.g., second) autonomous vehicle go unused due to a time period associated with a handover that would not occur if the handover was not performed.

Numbered List of Example System Embodiments

System Embodiment 1 A control system comprising: memory including a task list; and a processor configured to control one or more autonomous vehicles based on task list information, said processor being configured to: access (606) information in said task list indicating a first location at which a first operation associated with a first autonomous vehicle is to be performed and a second location where a second operation associated with the first autonomous vehicle is to be performed; determine (608) whether a worker handover (e.g., an assignment of an operation or a set of operations to be performed in association with an autonomous vehicle from one human picker or worker to another) for the second operation should be implemented based on a first estimated time cost for a first worker (W1) associated with the first autonomous vehicle at said first location for performing the second operation with the first autonomous vehicle and a second estimated time cost for a second worker (W2) not associated with the first autonomous vehicle at said first location for performing the second operation with the first autonomous vehicle; and control (538) the first autonomous vehicle to take an action based on said determination.

System Embodiment 1a The control system of System Embodiment 1, wherein the first estimated time cost is based on at least a time for the first worker to travel with the first autonomous vehicle to the second location.

System Embodiment 1b The control system of System Embodiment 1, wherein the second estimated time cost is based on at least a time for the first autonomous vehicle to travel unaccompanied at least a portion of the way from the first location to meet the second worker.

System Embodiment 2 The control system of System Embodiment 1, wherein the processor is further configured, as part of controlling (538) the first autonomous vehicle to take an action based on said determination to control the autonomous vehicle to: output (542) a worker notification to move from the first location to the second location; and route (550) the first autonomous vehicle from the first location to the second location when a worker handover is not to be implemented.

System Embodiment 3 The control system of System Embodiment 2, wherein the processor is further configured, as part of controlling (538) the first autonomous vehicle to take an action based on said determination, to control the autonomous vehicle to:
assign (548) the second operation to the second worker when the determination is a decision to implement a worker handover.

System Embodiment 4 The control system of System Embodiment 1, wherein the processor is further configured, as part of controlling (538) the first autonomous vehicle to take an action based on said determination, to control the autonomous vehicle to perform one or more of: i) routing (550) the first autonomous vehicle to a handover location or ii) operating (558 and/or 564) the first autonomous vehicle to require a login to the first autonomous vehicle by the second worker.

System Embodiment 4A The control system of System Embodiment 4, wherein the handover location is the second location.

System Embodiment 5 The control system of System Embodiment 3, wherein said first autonomous vehicle is a first robotic cart.

System Embodiment 6 The control system of System Embodiment 1, wherein the processor is further configured, as part of determining (608) whether a worker handover (e.g., an assignment of an operation or a set of operations to be performed in association for the second operation) should be implemented, to use at on at least an amount of time required for a first worker assigned to the first autonomous vehicle to travel from the first location to the second location with the first autonomous vehicle in making said determination of whether the worker handover should be implemented.

System Embodiment 7 The control system of System Embodiment 6, wherein the processor is further configured, as part of determining (608) whether a worker handover should be implemented, to base said determination on a second amount of time required for the second worker to travel to the second location.

System Embodiment 8 The control system of System Embodiment 7, wherein the processor is configured, as part of determining (608) whether a worker handover should be implemented, to: determine (610) a first cost value based on at least the amount of time required for the first worker assigned to the first autonomous vehicle to travel from the first location to the second location; and determine (614) a second cost value based on at least the second amount of time required for the second worker to travel to the second location.

System Embodiment 9 The control system of System Embodiment 8, wherein the processor is configured to: perform, prior to determining (610) the first cost value, the steps of: assigning (512) a first list of location dependent tasks to the first autonomous vehicle, said first set of location dependent tasks including a first task to be completed at the first location and a next task to be completed at a second location, said second location being different from said first location; and assigning (513) said first worker to the first autonomous vehicle to perform said first operation at said first location.

System Embodiment 10 The control system of System Embodiment 8, wherein the processor is configured as part of determining (608) whether a worker handover should be implemented, to: make a decision to implement a handover when the first cost value is greater than the second cost value.

System Embodiment 11 The control system of System Embodiment 10, wherein the first cost value is (612) further based on one, multiple, or all of: i) a cost metric based on the time for the first worker (W1) to complete the second operation (e.g., task) at the second location; ii) a weight based on the priority of the ongoing list of operations associated with the first autonomous vehicle (e.g., priority of order to which the first autonomous vehicle, e.g., first robotic mobile cart, corresponds-note that for a high priority order this weight would be negative to decrease the probability of a handoff which might increase overall time for the first list of operations to be completed); iii) a weight based on the effect (e.g., a negative weight if good effect, a positive weight if bad effect) of having the first worker reposition to the second location, thereby changing the worker distribution in the warehouse where the first autonomous vehicle is being used; and iv) a cost function based on whether the first worker will cross a zone boundary in a warehouse, where zones are defined, e.g., with a weight associated with a zone boundary crossing being positive reflecting an increased cost to thereby discourage movement of workers between zones).

System Embodiment 12. The control system of System Embodiment 10, wherein the second cost value is (616) further based on one, multiple or all of the following: i) the time for the second worker to login and take over operation of the first autonomous vehicle; ii) the time for the second worker to perform the next task associated with the first autonomous vehicle at the second location; and iii) the time required to the first worker to meet up with an additional autonomous vehicle and begin performing operations with the additional autonomous vehicle (this may include login times).

System Embodiment 13 The control system of System Embodiment 11, wherein the second cost value is (618), further based on one, multiple or all of: i) a weight associated with the first or second worker making an error during the handover, e.g., a navigation error delaying one of the first and second workers meeting with the first or additional autonomous vehicle within an expected amount of time; and ii) a robotic cost in terms of an amount of time either of the first autonomous vehicle or the additional (e.g., second) autonomous vehicle go unused due to a time period associated with a handover that would not occur if the handover was not performed.

Numbered List of Example Non-Transitory Computer Readable Medium Embodiments:

Non-Transitory Computer Readable Medium Embodiment 1 A non-transitory computer readable medium including processor executable instruction which when executed by a processor of a control system cause the processor to: access (606) information indicating a first location at which a first operation associated with a first autonomous vehicle is to be performed and a second location where a second operation associated with the first autonomous vehicle is to be performed; determine (608) whether a worker handover (e.g., an assignment of an operation or a set of operations to be performed in association with an autonomous vehicle from one human picker or worker to another) for the second operation should be implemented based on a first estimated time cost for a first worker (W1) associated with the first autonomous vehicle at said first location for performing the second operation with the first autonomous vehicle and a second estimated time cost for a second worker (W2) not associated with the first autonomous vehicle at said first location for performing the second operation with the first autonomous vehicle; and control (538) the first autonomous vehicle to take an action based on said determination.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere.

The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A method operating a control system including a processor to control one or more autonomous vehicles, the method comprising:
   accessing information indicating an operation to be performed with a first autonomous vehicle;
   determining whether a worker handover for the operation should be implemented based on a first estimated time cost for a first worker associated with the first autonomous vehicle for performing the operation with the first autonomous vehicle, and a second estimated time cost for a second worker not associated with the first autonomous vehicle for performing the operation with the first autonomous vehicle; and
   controlling the first autonomous vehicle to take an action based on said determination.

2. The method of claim 1, wherein the first estimated time cost and the second estimated time cost are estimated at a time a list of the operation and a prior operation is created.

3. The method of claim 1, wherein the second estimated time cost is estimated after a prior operation is completed by the first worker with the first autonomous vehicle.

4. The method of claim 3, wherein controlling the first autonomous vehicle to take the action based on said determination includes:
   outputting a worker notification to move from a first location to a second location; and
   routing the first autonomous vehicle from the first location to the second location when the worker handover is not to be implemented.

5. The method of claim 4, wherein controlling the first autonomous vehicle to take the action based on said determination includes:
   assigning a second operation to the second worker when the determination is a decision to implement the worker handover.

6. The method of claim 5, wherein said first autonomous vehicle is a first robotic cart.

7. The method of claim 1, wherein said controlling the first autonomous vehicle to take the action based on said determination comprises one or more of: i) routing the first autonomous vehicle to a handover location or ii) operating the first autonomous vehicle to require a login to the first autonomous vehicle by the second worker.

8. The method of claim 1, wherein determining whether the worker handover should be implemented is based on at on at least an amount of time required for the first worker assigned to the first autonomous vehicle to travel from a first location to a second location with the first autonomous vehicle.

9. The method of claim 8, wherein determining whether the worker handover should be implemented is further based on a second amount of time required for the second worker to travel to the second location.

10. The method of claim 9, wherein determining whether the worker handover should be implemented includes:
    determining a first cost value based on at least the amount of time required for the first worker assigned to the first autonomous vehicle to travel from the first location to the second location; and
    determining a second cost value based on at least the second amount of time required for the second worker to travel to the second location.

11. The method of claim 10, further comprising, prior to determining the first cost value, performing steps of:
    assigning a first list of location dependent tasks to the first autonomous vehicle, said first list of location dependent tasks including a first task to be completed at the first location and a next task to be completed at the second location, said second location being different from said first location; and
    assigning said first worker to the first autonomous vehicle to perform said operation at said first location.

12. The method of claim 10, wherein determining whether the worker handover should be implemented includes:
    making a decision to implement a handover when the first cost value is greater than the second cost value.

13. The method of claim 12, wherein the first cost value is further based on one, multiple, or all of: i) a cost metric based on a time required for the first worker to complete a second operation at the second location; ii) a weight based on a priority of an ongoing list of operations associated with the first autonomous vehicle; iii) a weight based on an effect of having the first worker reposition to the second location, thereby changing a worker distribution in a warehouse where the first autonomous vehicle is being used; and iv) a cost function based on whether the first worker will cross a zone boundary in the warehouse, in which zones correspond to a weight associated with a zone boundary crossing being positive reflecting an increased cost to thereby discourage movement of workers between the zones.

14. A control system comprising:
    memory including a task list; and
    a processor configured to control one or more autonomous vehicles based on the task list information, said processor being configured to:
    access information indicating an operation to be performed with a first autonomous vehicle;
    determining whether a worker handover for the operation should be implemented based on a first estimated time cost for a first worker associated with the first autonomous vehicle for performing the operation with the first autonomous vehicle, and a second estimated time cost for a second worker not associated with the first autonomous vehicle for performing the operation with the first autonomous vehicle; and
    controlling the first autonomous vehicle to take an action based on said determination.

15. The control system of claim 14, wherein the processor is further configured, as part of controlling the first autonomous vehicle to take the action based on said determination to control the first autonomous vehicle to:
    output a worker notification to move from the first location to the second location; and
    route the first autonomous vehicle from the first location to the second location when the worker handover is not to be implemented.

16. The control system of claim 15, wherein the processor is further configured, as part of controlling the first autonomous vehicle to take the action based on said determination, to control the first autonomous vehicle to:
assign a second operation to the second worker when the determination is a decision to implement the worker handover.

17. The control system of claim 14, wherein the processor is further configured, as part of controlling the first autonomous vehicle to take the action based on said determination, to control the first autonomous vehicle to perform one or more of: i) routing the first autonomous vehicle to a handover location or ii) operating the first autonomous vehicle to require a login to the first autonomous vehicle by the second worker.

18. The control system of claim 14, wherein the processor is further configured, as part of determining whether the worker handover should be implemented, to use at least an amount of time required for the first worker assigned to the first autonomous vehicle to travel from the first location to the second location with the first autonomous vehicle in making said determination of whether the worker handover should be implemented.

19. The control system of claim 18, wherein the processor is further configured, as part of determining whether the worker handover should be implemented, to base said determination on a second amount of time required for the second worker to travel to the second location.

20. The control system of claim 19, wherein the processor is configured, as part of determining whether the worker handover should be implemented, to:
determine a first cost value based on at least the amount of time required for the first worker assigned to the first autonomous vehicle to travel from the first location to the second location; and
determine a second cost value based on at least the second amount of time required for the second worker to travel to the second location.

21. The control system of claim 20, wherein the processor is configured as part of determining whether the worker handover should be implemented, to:
make a decision to implement a handover when the first cost value is greater than the second cost value.

22. A non-transitory computer readable medium including processor executable instruction which when executed by a processor of a control system cause the processor to:
access information indicating an operation to be performed with a first autonomous vehicle;
determining whether a worker handover for the operation should be implemented based on a first estimated time cost for a first worker associated with the first autonomous vehicle for performing the operation with the first autonomous vehicle, and a second estimated time cost for a second worker not associated with the first autonomous vehicle for performing the operation with the first autonomous vehicle; and
controlling the first autonomous vehicle to take an action based on said determination.

* * * * *